(12) United States Patent
Petersen et al.

(10) Patent No.: US 7,170,997 B2
(45) Date of Patent: Jan. 30, 2007

(54) METHOD OF GENERATING PSEUDO-RANDOM NUMBERS IN AN ELECTRONIC DEVICE, AND A METHOD OF ENCRYPTING AND DECRYPTING ELECTRONIC DATA

(75) Inventors: Mette Vesterager Petersen, Copenhagen N. (DK); Hans Martin Boesgaard Sørensen, Lyngby (DK)

(73) Assignee: Cryptico A/S, Copenhagen (DK)

( * ) Notice: Subject to any disclaimer, the term of this patent is extended or adjusted under 35 U.S.C. 154(b) by 626 days.

(21) Appl. No.: 10/017,230

(22) Filed: Dec. 7, 2001

(65) Prior Publication Data

US 2002/0154769 A1 Oct. 24, 2002

(51) Int. Cl.
*H04L 9/00* (2006.01)
*G06F 7/38* (2006.01)
(52) U.S. Cl. .................. 380/268; 380/263; 708/490
(58) Field of Classification Search ............... None
See application file for complete search history.

(56) References Cited

U.S. PATENT DOCUMENTS

| | | | |
|---|---|---|---|
| 5,007,087 A * | 4/1991 | Bernstein et al. ............. 380/46 |
| 5,048,086 A | 9/1991 | Bianco et al. |
| 5,193,115 A | 3/1993 | Vobach |
| 5,359,659 A * | 10/1994 | Rosenthal .................... 726/24 |
| 5,383,143 A * | 1/1995 | Crouch et al. ............... 708/254 |
| 5,442,705 A | 8/1995 | Miyano |
| 5,479,513 A | 12/1995 | Protopopescu et al. |
| 5,572,454 A | 11/1996 | Lee et al. |
| 5,612,973 A | 3/1997 | Gershenfeld |
| 5,680,462 A | 10/1997 | Miller et al. |
| 5,696,826 A | 12/1997 | Gao |
| 5,696,828 A | 12/1997 | Koopman, Jr. |
| 5,729,607 A | 3/1998 | DeFries et al. |

(Continued)

FOREIGN PATENT DOCUMENTS

EP 0 467 239 A2 1/1992

(Continued)

OTHER PUBLICATIONS

Carroll et al., Chaos in Cryptography: The Escape from the Strange Attractor, Jan. 1992, Cryptologia, pp. 52-72.*

(Continued)

*Primary Examiner*—Kambiz Zand
*Assistant Examiner*—Kristin D. Sandoval
(74) *Attorney, Agent, or Firm*—Harness, Dickey & Pierce, P.L.C.

(57) ABSTRACT

A method of performing numerical computations in a mathematical system with at least one function, including expressing the mathematical system in discrete terms, expressing at least one variable of the mathematical system as a fixed-point number, performing the computations in such a way that the computations include the at least one variable expressed as a fixed-point number, obtaining, from the computations, a resulting number, the resulting number representing at least one of at least a part of a solution to the mathematical system, and a number usable in further computations involved in the numerical solution of the mathematical system, and extracting a set of data which represents at least one of a subset of digits of the resulting number, and a subset of digits of a number derived from the resulting number.

123 Claims, 14 Drawing Sheets

U.S. PATENT DOCUMENTS

| | | | |
|---|---|---|---|
| 5,732,138 A | 3/1998 | Noll et al. | |
| 5,751,811 A | 5/1998 | Magnotti et al. | |
| 5,757,923 A | 5/1998 | Koopman, Jr. | |
| 5,889,868 A * | 3/1999 | Moskowitz et al. | 713/176 |
| 5,960,201 A | 9/1999 | Ma et al. | |
| 6,014,445 A | 1/2000 | Kohda et al. | |
| 6,018,582 A | 1/2000 | Francois et al. | |
| 6,049,614 A | 4/2000 | Kim | |
| 6,064,738 A | 5/2000 | Fridrich | |
| 6,078,665 A | 6/2000 | Anderson et al. | |
| 6,079,018 A * | 6/2000 | Hardy et al. | 713/170 |
| 6,178,217 B1 | 1/2001 | Defries et al. | |
| 6,295,376 B1 | 9/2001 | Nakaya | |
| 6,301,360 B1 | 10/2001 | Bocionek et al. | |
| 6,587,563 B1 * | 7/2003 | Crandall | 380/263 |
| 6,744,893 B1 * | 6/2004 | Fleming-Dahl | 380/263 |
| 2001/0028682 A1 | 10/2001 | Nakaya et al. | |
| 2001/0028745 A1 | 10/2001 | Kakaya | |

FOREIGN PATENT DOCUMENTS

| | | |
|---|---|---|
| EP | 0 618 701 A2 | 10/1994 |
| EP | 0 884 912 A2 | 12/1998 |
| EP | 0 896 452 A2 | 2/1999 |
| EP | 0 940 675 A1 | 9/1999 |
| EP | 0 949 563 A2 | 10/1999 |
| EP | 0 994 598 A1 | 4/2000 |
| EP | 1 001 641 A2 | 5/2000 |
| EP | 1 063 811 A1 | 12/2000 |
| EP | 1 069 498 A2 | 1/2001 |
| EP | 1 113 617 A2 | 7/2001 |
| EP | 1 119 133 A2 | 7/2001 |
| WO | WO 96/06494 | 2/1996 |
| WO | WO 96/38946 | 12/1996 |
| WO | WO 97/11423 | 3/1997 |
| WO | WO 98/10562 | 3/1998 |
| WO | WO 98/24205 | 6/1998 |
| WO | WO 98/36523 | 8/1998 |
| WO | WO 98/59458 | 12/1998 |
| WO | WO 00/07327 | 2/2000 |
| WO | WO 00/28695 | 5/2000 |
| WO | WO 01/47178 A2 | 6/2001 |
| WO | WO 01/50676 A2 | 7/2001 |

OTHER PUBLICATIONS

Boesgaard et al.: Rabbit: A New High-Performance Stream Cipher, to be published in Proceedings of Fast Software Encryption (FSE) 2003, Springer, Berlin.

Kamata et al.: Communication with Chaos via DSP Implementation, 1997 IEEE International Symposium, Jun. 9-12, 1997, Hong Kong.

Yates: Fixed-Point Arithmetic: An Introduction, Digital Sound Labs, Mar. 3, 2001.

Summary of Evaluatie En Mplementatie Van Authentiseringsalgoritmen.

Hiroyuki Kamata, et.al, "Secure Communication System Using Chaos Via DSP Implementation",May 12, 1996, pp. 112-115.

John M. Carroll, et al., "Chaos In Cryptography: The Escape From The Strange Attractor", Jan. 1992, pp. 52-72.

European Search Report dated Nov. 13, 2001.

Jiri Fridrich, "Symmetric Ciphers Based on Two-Dimensional Chaotic Maps", *Journal of Bifurcation and Chaos*, 8:6:1259-1284 (1998).

Hong Zhou, "Secure Communication Via One-Dimensional Chaotic Inverse Systems", *International Symposium on Circuits and Systems—Hong Kong*, Jun. 9-12, 1029-1032 (1997).

Communication from European Patent Office dated Oct. 1, 2004.

Office Action for corresponding European Application No. 01270019.1 dated Feb. 28, 2006.

Bill Solibrici "Fixed-point DPS chip can generate real-time random noise," EDN Electrical Design News, vol. 38, No. 9, pp. 119-122, Apr. 29, 1993.

Hak Fui G. Tam "Studies of Discrete Logistic Map," Feb. 21, 2003, retrieved from internet: URL:http://222.phy.cuhk.edu.hk/sure/comments_2000/tam_paper.html>.

* cited by examiner

METHOD OF GENERATING PSEUDO-RANDOM NUMBERS IN AN ELECTRONIC DEVICE, AND A METHOD OF ENCRYPTING AND DECRYPTING ELECTRONIC DATA

TECHNICAL FIELD

The present invention relates to a method of performing numerical computations in a mathematical system comprising at least one function, in particular a non-linear function. The mathematical system may be a non-linear system of differential equations which exhibits chaotic behavior. The invention also relates to a pseudo-random number generator applicable to an encryption and decryption method, and to such an encryption and decryption method. An electronic device is preferably used for performing the computations.

BACKGROUND OF THE INVENTION

Cryptography is a generally used term covering science and technology concerned with transforming data, so as to be able to store and transmit the data while being able to prevent unauthorized access to the data. By means of cryptography, the data are made non-comprehensible for any other person but the intended recipient or recipients of the data. Accordingly, cryptography plays an increasingly more important role in the protection of intellectual property, including copyright protection, as the technological advancements require safe transmission and storage of huge amounts of data.

In an encryption and decryption algorithm, the specific transformation of data is dependent on an input to the algorithm, a so-called key. In case the sender and the recipient of the data have an appropriate set of keys, the sender and the recipient are able to correctly encrypt and decrypt the data while any third person who may gain access to the encrypted data is not able to view a properly decrypted version of the encrypted data, as she or he is not in possession of an appropriate key.

Usually, a set of data to be encrypted is referred to as "plaintext" or "original data", whereas the encrypted version of the set of data is referred to as "ciphertext" or "encrypted data".

Two types of symmetric cryptographic algorithms are the so-called "block cipher" and the so-called "stream cipher". Both types of algorithms use symmetric keys, i.e. the keys used for encryption and decryption are equal or trivially related. A block cipher is a cryptographic algorithm which splits an original set of data into a plurality of blocks of a given size, e.g. 64 bits per block. Mathematical and logical operations are performed on each block, whereby the original amount of data is usually transformed into blocks of pseudo-random data. In case decryption is initiated with the correct decryption key, the original data can be re-called by reversing the mathematical and logical operations used for encryption.

In a (synchronous) stream cipher, a pseudo-random number generator generates, based on a key, a sequence of pseudo-random numbers, the sequence being referred to as a keystream. The keystream is mixed, by arithmetic and/or logical operations, with a plurality of sub-sets of the original set of data, the sum of sub-sets of data defining the original data to be encrypted. The result of the mixing is the encrypted data. The set of encrypted data may be decrypted by repeating the procedure in such a way that the pseudo-random sequence is extracted from the encrypted data, so as to arrive at the original, decrypted data.

The plaintext is often mixed with the keystream by use of a logical operator, the so-called XOR operator, also referred to as the "exclusive or" operator, which is symbolized by the $\oplus$ symbol. XOR generates a one-bit result from two one-bit arguments. All possible combinations are:

$0 \oplus 0 = 0$
$0 \oplus 1 = 1$
$1 \oplus 0 = 1$
$1 \oplus 1 = 0$

Utilization of the XOR operator on a plaintext and a pseudo-random keystream yields a ciphertext. During decryption, an identical keystream is generated, and the XOR operator is now utilized on the keystream and the ciphertext, resulting in the original plaintext. The identical keystream can only be generated by using the key on which the keystream for encryption was initially based.

Further, so-called public key systems have been developed, such systems being characterized by a pair of asymmetric keys, i.e. a public key and a private key, the two keys being different. In such systems, the public key is usually used for encryption, and the private key is usually used for decryption. The private and the public key correspond to each other in a certain manner. The key which is used for encryption cannot be used for decryption, and vice versa. Thus, the public key may be published without violating safety in respect of accessibility of the original data. Accordingly, when transmitting encrypted data via a computer communications network, the recipient of the data first generates a set of keys, including a public and a private key. The public key, for example, is then provided to the sender of the data, whereas the private key is stored at a secure location. The sender of the data utilizes the public key for encrypting the original data, and the encrypted data are then transferred to the recipient. When the recipient receives the encrypted data, the private key, which corresponds to the public key previously utilized for encryption, is provided to the decryption system which processes the encrypted data so as to arrive at the original decrypted data. Public key systems are primarily used for transmitting keys which are utilized in, e.g., block or stream ciphers, which in turn perform encryption and decryption of the data.

The methods of the present invention are applicable to cryptographic methods, in particular but not exclusively to stream cipher algorithms, block cipher algorithms, Hash functions, and MAC (Message Authentication Code) functions. Such methods, functions and algorithms may include pseudo-random number generators which are capable of generating pseudo-random numbers in a reproducible way, i.e. in a way that results in the same numbers being generated in two different cycles when the same key is used as an input for the pseudo-random number generator in the two cycles.

In order to generate pseudo-random numbers, it has been proposed to utilize numerical solutions of chaotic systems, i.e. systems of non-linear differential equations or mappings exhibiting chaotic behavior. The term "chaotic" may in a strict mathematical sense only be used in the context of a continuous system. However, the present text also refers to discrete or finite systems having at least one positive Lyapunov exponent as being "chaotic".

A chaotic system normally governs at least one state variable X, the numerical solution method of such a system normally comprising performing iteration or integration steps. In a chaotic system, the solution $X_n$ at a given instant is dependent on the initial condition $X_0$ to such an extent that a small deviation in $X_0$ will result in a huge deviation in the solution $X_n$, the system often being referred to as exhibiting sensitivity on initial conditions. Thus, in order for the pseudo-random number generator, i.e. the algorithm numerically solving the chaotic system to give a reproducible stream of pseudo-random numbers, the exact initial condition $X_0$ must be known. Thus, in cryptographic algorithms relying on chaotic systems, the initial condition $X_0$ used in the numerical solution of the chaotic system is derived from the key entered by a user of the cryptographic system, thereby allowing the same stream of pseudo-random numbers to be generated for e.g. encryption and decryption of data.

Lyapunov exponents measure the rates of divergence or convergence of two neighboring trajectories, i.e. solution curves, and can be used to determine the stability of various types of solutions, i.e. determine whether the solution is for example periodic or chaotic. A Lyapunov exponent provides such a measure from a comparison between a reference orbit and a displaced orbit. Iterates of the initial condition $X_0$ are denoted the reference orbit, and the displaced orbit is given by iterates of the initial condition $X_0+y_0$, where $y_0$ is a vector of infinitely small length denoting the initial displacement. The initial orientation of the initial displacement is given by $u_0=y_0/|y_0|$. Using this notation, the Lyapunov exponent, $h(x_0, y_0)$, is defined as $$h(x_0, u_0) = \lim_{n\to\infty} \frac{1}{n} \ln(|y_n|/|y_0|)$$

where $y_n$ is the deviation of the displaced orbit from the reference orbit, given by the n'th iterate of $x_0$. For systems whose dimension is larger than one, there is a set or spectrum of Lyapunov exponents, each one characterizing orbital divergence or convergence in a particular direction. Thus, if the system has N degrees of freedom, it will have N Lyapunov exponents which, however, are not necessarily distinct. In all practical situations, a positive Lyapunov exponent indicates chaos. The type of irregular behavior referred to as hyperchaos is characterized by two or more positive Lyapunov exponents. Numerical calculation of Lyapunov exponents may be performed according to the suggested method in T. S. Parker and L. O. Chua: Practical Numerical Algorithms for Chaotic Systems, pp. 73–81.

Even more irregular systems than hyperchaotic systems exhibit so-called turbulence, which refers to the type of behaviour exhibited by a system having a continuous spectrum of positive Lyapunov exponents. Turbulence may be modeled by partial differential equations, for example the well-known Navier-Stokes equations.

A large number of prior art documents are concerned with solving chaotic systems, in particular to be used in cryptographic algorithms, also including stream cipher algorithms relying on chaotic systems, some of which are briefly mentioned below as a general introduction to the background art.

U.S. Pat. No. 5,007,087 assigned to Loral Aerospace Corp. discloses a method and an apparatus for generating random numbers using chaos. The patent describes solving chaotic systems for generating random number sequences and mentions its possible use in cryptography, in particular in the field of key generation and management. The document mentions that repeatability of the number sequence should be avoided.

U.S. Pat. No. 5,048,086 assigned to Hughes Aircraft Company is related to an encryption system based on chaos theory. The system uses the logistic equation $x_{n+1}=\mu x_n(1-x_n)$, which is a mapping exhibiting chaos for certain values of $\mu$. In the computations, floating-point operations are used.

U.S. Pat. No. 6,014,445 assigned to Kabushiki Kaisha Toshiba, Kawasaki, discloses an enciphering/deciphering apparatus and a method incorporating random variable and key-stream generation. The disclosure is related to chaotic stream ciphers and mentions that floating-point computations are used.

PCT Application WO 98/36523 assigned to Apple Computer, Inc. discloses a method of using a chaotic system to generate a public key and an adjustable back door from a private key. The need for establishing rules of precision during computations on a chaotic system is mentioned. The document states, as an example, that a specified floating point or fixed point precision can be identified along with specific standards for round-off.

"Numerical Methods and Software" by D. Kahaner, C. Moler and S. Nash (Prentice-Hall International Editions, 1989) contains a general introduction to (pseudo-)random number generation. The book mentions the following criteria for judging the quality of (pseudo-) random number generators:

a) High quality: the generator should pass all the statistical tests and have an extremely long period,
b) Efficiency: execution should be rapid and storage requirements minimal.
c) Repeatability: Specifying the same starting conditions will generate the same sequence.

The user should be able to restart the generator at any time, but explicit initialization is not necessary. A slight change in the starting procedure will result in a different random sequence.

d) Machine independence and portability: The algorithm should work on different kinds of computers; in particular, no operation should cause the program to stop. The same sequence of random numbers should be produced on different computers by initializing the generator in exactly the same way.

e) Simplicity: The algorithm should be easy to implement and use.

The book further states that no generator can be successful in satisfying all of these criteria.

"Secure Communication System Using Chaos via DSP Implementation" by H. Kamata, E. Tetsuro and Y. Ishida (IEEE 1996) describes a communication system based on a chaotic circuit, where a digital signal processor (DSP) is used in the implementation of the system.

By using fixed-point DSP, the system is made more robust than analog circuits. The recovery of a transmitted message is based on synchronizing the chaotic receiver system with the transmitter system.

It is known to use fixed-point variables in numerical computations, for example in Intel Mandelbrot computations. Intel (cf. MMX™ Technology Application Notes, "Implementing Fractals with MMX™ Technology", publicly accessible on http:H/developer.intel.com/software/idap/resources/technical_collateral/mmx/MANDEL.HT M on Dec. 7, 2001) has explained how a Mandelbrot set (the set being derivable from a non-linear system) may be computed in a fast manner using MMX technology (an add-on to Intel's processors which speeds up certain computations). This is done using fixed-point computations.

The Mandelbrot set is computed by means of the below mapping:

$$Z_{n+1} = Z_n^2 - \mu$$

Intel utilizes a constant decimal separator position in their computations. A so-called 5.11 is utilized, i.e. a 16 bit number is utilized wherein the decimal separator is placed after the 5'th bit, "5" referring to 5 bits after the decimal separator, "11" referring to 11 bits after the decimal separator.

SUMMARY OF THE INVENTION

Usually on a computer, real numbers are represented by floating point type numbers. A floating-point number is defined as a number consisting of a mantissa and an exponent, e.g. $31415 \cdot 10^{-4}$, where "31415" is the mantissa and "−4" is the exponent. When a computer is performing a calculation on a floating-point variable, it recalculates the exponent to match the result each time. The name "floating-point" refers to the fact that the decimal separator is moving at calculations, caused by the varying exponent. However, floating point arithmetic is defined differently on various processor architectures causing different handling of precision and rounding off. Instead of floating-point numbers, fixed-point numbers can be used. A fixed-point number is represented as an integer type number on a computer, where a virtual decimal point or separator (also referred to as an imaginary decimal separator) is introduced "manually", i.e. by the programmer, to separate the integer part and the fractional part of the real number. Hence, calculations on fixed-point numbers are performed by simple integer operations, which are identical on all processors in the sense that the same computation, performed on two different processors, yields identical results on the two processors, except for possible different representations of negative numbers. Such possible different representations may occur as a consequence of some processors utilizing ones complement and other processors utilizing twos complement. Furthermore, these operations are also usually faster than the corresponding floating point operations.

In general, a fixed-point number type is denoted $\Phi(\alpha.\beta)$ where $\alpha$ is the number of bits used to hold the integer part, and $\beta$ the number of bits to hold the fractional part. The values of $\alpha$ and $\beta$, and thus the position of the decimal point, are usually predetermined and stationary. The fixed-point number can be either unsigned or signed, in which case $\Phi$ is denoted U or S respectively. In the latter case, a bit is needed to hold the sign, thus $\alpha+\beta+1$ bits are needed to hold $S(\alpha.\beta)$. The range of $U(\alpha.\beta)$ is $[0; 2^\alpha - 2^{-\beta}]$, and the range of $S(\alpha.\beta)$ is $[-2^\alpha; 2^\alpha - 2^{-\beta}]$. The resolution of the fixed-point numbers is thereby $2^{-\beta}$.

The position of the decimal separator in a fixed-point number is a weighting between digits in the integer part and digits in the fraction part of the number. To achieve the best result of a calculation, it is usually desired to include as many digits after the decimal separator as possible, to obtain the highest resolution. However, it may also be important to assign enough bits to the integer part to ensure that no overflow will occur. Overflow is loading or calculating a value into a register that is unable to hold a number as big as the value loaded or calculated. Overflow results in deletion of the most significant bits (digits) and possible sign change.

In the various aspects of the present invention, the position of the decimal separator may be assigned at design time. To choose the right position, the possible range of the number, for which the position is to be chosen, is preferably analyzed. The most positive and most negative possible values are determined, and the highest absolute value of the two is inserted into the following formula:

$$\alpha = \text{ceil}(\log_2(\text{abs}(\text{MaxVal})))$$

to determine the value of $\alpha$.

The position of the decimal point may vary between different fixed-point variables. However, addition and subtraction operations require input numbers with similar positions. Hence, it is sometimes necessary to shift the position of the decimal point. Right shift by n bits corresponds to a conversion from $\Phi(\alpha.\beta)$ to $\Phi(\alpha+n.\beta-n)$. Left shift by n bits will convert $\Phi(\alpha.\beta)$ to $\Phi(\alpha-n.\beta+n)$. Conversion of unsigned numbers is done by logical shift operations, whereas arithmetical shifts are used for signed numbers.

The mathematical operations addition, subtraction, multiplication and division on fixed-point numbers are carried out as plain integer operations. The addition and subtraction operations may result in a number of size $\Phi(\alpha+1.\beta)$ because of the carry. However, the result is normally truncated to give a number with the same format as the input.

Multiplication and division do not require arguments with similar positions of the decimal separators. However, prior to division, the numerator is expanded as it must have twice the length of the denominator and the result. The results will have a format of: $S(\alpha.\beta).S(c.d)=S(\alpha+c+1.\beta+d)$ and $S(\alpha+c+1.\beta+d)/S(\alpha.\beta)=S(c.d)$. For unsigned multiplication and division $S(\alpha+c+1.\beta+d)$ is replaced by $U(\alpha+c.\beta+d)$. Exceeding digits in the multiplication compared to the predetermined result format are cut off to match the target register size.

Further information on fixed-point calculations can be found in "Fixed-Point Arithmetic: An Introduction" by R. Yates (The text can be found at http:H/personal.mia.bellsouth.net/lig/y/a/yatesc/fp.pdf on 7 Dec. 2001).

The utilization of floating point variables in the numerical solution of mathematical systems may create non-predictable truncation and/or rounding errors. In case of the mathematical system to be solved being non-linear, and in particular in case of the system being chaotic, the accuracy of the solution at all integration steps is of paramount importance, as a small deviation at one step may confer huge deviations at subsequent steps. If the truncation and/or rounding errors are created consistently in the same manner in any and all computations, two solutions based on the same initial conditions are identical, and accordingly the computations are reproducible. However, in most cases truncation and/or rounding errors of floating point numbers are not entirely controlled by software but also by hardware on which the software is running. Accordingly, truncation and/or rounding errors are hardware dependent, and consequently truncations and/or roundings may be performed differently in two different hardware processors. For most computations this is without importance, as the truncations and roundings create inaccuracies of an order of magnitude which is far below the required accuracy of the computations. But in the solution of, e.g., chaotic systems, a small deviation in the way truncations are performed may confer huge deviations in the solution at later computational steps.

It is thus an object of the present invention to provide a method of performing numerical computations in a mathematical system and a method of generating pseudo-random numbers, in which methods truncation and/or rounding errors are predictable or in which such errors may be entirely controlled by software, i.e. in which the accuracy of the computations is hardware independent. It is a further object of the invention to provide a method of performing such numerical computations and a method of generating pseudo-random numbers in a reproducible way, which methods, when run on a computer, are fast, i.e. which utilize the available hardware processor capacity optimally. It is a still further object of the invention to provide a method and a system for decrypting and encrypting data which is fast when run a computer.

Where in the present context, the term "pseudo-random number" is used, this should be understood as a random number which may be generated in a reproducible and/or deterministic way, i.e. in a way that results in the same pseudo-random number being generated in two different executions of a pseudo-random number generating algorithm when the same key or seed value is used as an input for the pseudo-random number generating algorithm in the two executions.

In the present context, a fixed-point variable is defined as an integer type number with an imaginary decimal separator, an integer being defined as a number without digits after the decimal separator. Accordingly, real numbers are represented by inserting the imaginary decimal separator (or decimal point) at some fixed predetermined position within an integer, for example four digits from the left. The position might be changed as a consequence of a mathematical operation on the number. The position may also be forced to be changed by use of a logical operation.

As it occurs from the above discussion, fixed-point numbers are integers, on which a virtual decimal separator is imposed. The number consists of a so-called "integer part", referring to the bits before the decimal separator, and a "fraction part" referring to the bits after the decimal separator. In the present context, bits are also referred to as digits and vice versa.

In a computer program comprising fixed-point number computations or in an electronic circuit or device for performing fixed-point computations, means may be provided for determining a suitable location of the decimal separator. Thus, the program, circuit or device may, during computations, detect possible overflow and, in the case of a possible overflow being detected, change the number of bits on either side of the decimal separator, i.e. the location of the decimal separator in a register which stores the variable or variables in question. This change may be performed by moving the decimal separator one or more positions to the left or to the right. Preferably as many bits as possible are used to the right of the decimal separator in order to minimize the number of possible unused bits in the register and thereby to obtain an optimal accuracy in the computations. By changing the position of the decimal separator, though some computational speed may be lost due to the requirement for additional operations for detecting possible overflow, the accuracy of the computations is optimized while the risk of overflow is eliminated or reduced, without a designer or programmer of an application incorporating the computer program, circuit or device needing to make considerations concerning accuracy and overflow in a design or programming phase. Alternatively, or additionally, a test program may be provided which determines when or where in the computations overflow will occur or is likely to occur, so that a programmer or designer of the program may fix the position of the decimal separator in one or more variables such that no overflow occurs, whereby, in the final implementation, no determination of possible overflow is needed. However, the determination of possible overflow may also be incorporated in the final implementation as an additional safeguarding feature. Further, the programmer or designer may choose to implement changing of the decimal separator at fixed, predetermined stages in the computations.

As discussed above, a real number may be expressed by means of one or more fixed-point numbers. Likewise, a complex number, $c=a+ib$, where $i^2=-1$, may be expressed by means of one or more fixed-point numbers, e.g. by expressing the real part a and/or the imaginary part b as a fixed-point number. In case only one of the real and imaginary parts is expressed as a fixed-point number, the other one may be expressed by means of any other type of number, such as a floating-point or an integer number.

In the present context, the term "data carrier" or "computer readable data carrier" should be understood as any device or media capable of storing data which is accessible by a computer or a computer system. Thus, a computer readable data carrier may, e.g., comprise a memory, such as RAM, ROM, EPROM, or EEPROM, a CompactFlash Card, a MemoryStick Card, a floppy or a hard disk drive, a Compact Disc (CD), a DVD, a data tape, or a DAT tape.

Signals comprising data derived from the methods of the present invention and data used in such methods may be transmitted via communications lines, such as electrical or optical wires or wireless communication means using radio or optical transmission. Examples are the Internet, LANs (Local Area Networks), MANs (Metropolitan Are Networks), WANs (Wide Area Networks), telephone lines, leased lines, private lines, and cable or satellite television networks.

In the present context, the term "electronic device" should be understood as any device of processing data by means of electronic or optical impulses. Examples of applicable electronic devices to the methods of the present invention are: a processor, such as a CPU, a microcontroller, or a DSP (Digital Signal Processor), a computer or any other device incorporating a processor or another electronic circuit for performing mathematical computations, including a personal computer, a mainframe computer, portable devices, smartcards, chips specifically designed for certain purposes, e.g., encryption. Further examples of electronic devices are: a microchip adapted or designed to perform computations and/or operations.

Processors are usually categorized by: (a) the size of data that is operated on (b) the instruction size and (c) the memory model. These characteristics may have different sizes, normally between 4 and 128 bit (e.g. 15, 16, 32, 64 bit) and not limited to powers of two.

In the present context, the term "processor" covers any type of processor, including but not limited to:

"Microcontroller", also called "embedded processor". The term "microcontroller" and "embedded processor" usually refers to a small processor (usually built with fewer transistors than big processors and with limited power consumption). Examples of microcontroller architectures are:

Z80

8051 (e.g. produced by Intel)

CPU8/6800 (e.g. 68HC05 68HC08 and 68HC11e.g. produced by Motorola)

CPU32/68k (e.g. 68000 Dragonball produced by Motorola)

Other processors which are typically used in different kinds of computer and control systems, examples of architectures being:

Alpha 21xxx (e.g. 21164, 21264, 21364)

AMD x86-64 (e.g. Sledgehammer)

ARM (e.g. ARM10, StrongARM)

CPU32/68k (e.g. 68000, 68030, 68040 e.g. produced by Motorola)
IA32 (e.g. the x86 family produced by Intel (e.g. i486, Pentium), AMD (e.g. K6, K7), and Cyrix)
IA64 (e.g. Itanium produced by HP/Intel)
MIPS (e.g. R4000, R10000 produced by SGI)
PA-RISC (e.g. 8000, produced by HP)
PowerPC (e.g. G3, G4, produced by IBM/Motorola)
SPARC (e.g. UltraSPARC II, UltraSPARC III, produced by SUN)
DSPs. Examples are:
DSP56300 (produced by Motorola)
MSC8100 (produced by Motorola)
TI TMS320C6711 (produced by Texas Instruments).

In the present context, the term "register" should be understood as any memory space containing data, such as a number, the memory space being for example a CPU register, RAM, memory in an electronic circuit, or any data carrier, such as a hard disk, a floppy disk, a Compact Disc (CD), a DVD, a data tape, or a DAT tape.

It should be understood that the present invention also relates to, in independent aspects, data derived from the methods of the present invention. It should also be understood that where the present invention relates to methods, it also relates to, in independent aspects, computer programs being adapted to perform such methods, data carriers or memory means loaded with such computer programs, and/or computer systems for carrying out the methods.

Any and all computational operations involved in the methods of the present invention may be carried out on or by means of an electronic device.

In a first aspect the present invention provides a method of, performing numerical computations in a mathematical system comprising at least one function, the method comprising the steps of:
expressing the mathematical system in discrete terms,
expressing at least one variable of the mathematical system as a fixed-point number,
performing said computations in such a way that the computations include the at least one variable expressed as a fixed-point number,
obtaining, from said computations, a resulting number, the resulting number representing at least one of:
a. at least a part of a solution to the mathematical system, and
b. a number usable in further computations involved in the numerical solution of the mathematical system,
the method further comprising:
extracting a set of data which represents at least one of:
i. a subset of digits of the resulting number, and
ii. a subset of digits of a number derived from the resulting number.

A subset of a number may be regarded as a part of that number, such as some, but not necessarily all digits or bits of the number. For example, the 8 least significant bits of a 16-bit number may be regarded as a subset of the 16-bit number.

The term "extracting" covers, but is not limited to: outputting the number or subset in question, for example as a keystream or a part of a keystream or as any other final or intermediate result of a computational process; storing the number or subset in question in a register, for example in order to allow for further use thereof, such as for further computations, on the subset.

By extracting a subset of digits of a number instead of extracting the entire number, random properties are improved in case the method is used in a pseudo-random number generator, for example for encryption and/or decryption purposes. Moreover, as only a subset is extracted, less information concerning the internal state of the mathematical system is contained in the extracted set of data which enhances the security of an encryption/decryption system incorporating the method of the invention.

Though the mathematical system may comprise a continuous system, for example a system of differential equations, it may also or alternatively comprise a system which is originally defined in discrete terms, for example in the case of a map. The at least one function of the mathematical system may be non-linear, as discussed in more detail below.

Usually, the subset of digits comprises k bits of an m-bit number, $k \leq m$, for example extracting 8 bits of a 32-bit number. The number from which the subset is extracted and/or the extracted set of data may be expressed as one or more binary number, octal number, decimal numbers, hexadecimal number, etc. The k bits may be the least significant bits of the number, or it may be k bits selected from predetermined or random positions within the number from which the bits are extracted. For example, from a 64-bit number, bits Nos. 42, 47, 53, 55, 56, 57, 61, and 63 may be extracted, or bits Nos. 47–54.

The method according to the first aspect of the invention may be applied for encryption and decryption, modulation of radio waves, synchronization of chaos in picture and sound signals so as to reduce noise, data compression, in control systems, watermarking, steganography, e.g. for storing a document in the least significant bits of a sound file, so as to hide the document in digital transmission.

The use of fixed-point numbers has the advantage over floating-point numbers that rounding and/or truncations errors occurring in fixed-point number computations are identically defined on all processors. By use of fixed-point variables, decimal numbers may be expressed as integer type numbers where an imaginary decimal separator is placed in the number. In cases where floating-point variables are used, truncation/rounding errors are not performed identically on different types of processors.

As a consequence of truncation/rounding errors being controllable or predictable, numerical computations in mathematical systems which are sensible to truncation/rounding errors may be performed in a reproducible manner. Thus, for example, non-linear systems, in particular chaotic systems, may be numerically solved in a reproducible manner. This opens up for utilizing chaotic systems in pseudo-random number generators, such as in encryption/decryption algorithms, without the need for feed-back or correction algorithms or registers in order to prevent inaccuracies, or without the need for synchronization techniques ensuring identical solution of the systems in encryption as in decryption. This in turn contributes to the computations, the pseudo-random number generation and/or the encryption/decryption algorithm being fast as compared to algorithms involving such feed-back or correction algorithms or synchronization techniques. Further, there is no need for transmission of synchronization data with the encrypted data, such synchronization data often amounting to a size comparable to the size of the encrypted data, which may be a major problem due to, e.g., lack of bandwidth when transmitting data via the Internet. Further, transmission of such data compromises the security of the system. The computations are also performed faster than computations in methods involving a floating-point variable for the variable in question, as in computations involving fixed-point numbers the hardware processor performs computations as integer number computations, computations on integer number being generally faster than computations on floating-point numbers.

In the present context, the term "resulting number" should be understood as any number occurring in the computations. More than one resulting number may be obtained. The resulting number may, as stated above, be a part of the solution to the mathematical system and/or an intermediate result, i.e. a number assigned to any variable or parameter of the mathematical system or to any other variable or parameter used in the computations. In an implementation of the method, the resulting number or a part thereof may be extracted, for example as a pseudo-random number for use in an encryption/decryption system. Alternatively, one or more mathematical and/or logical operations may be performed on the resulting number or on a plurality of resulting numbers, so as to obtain a further number which is extracted. All or only selected bits in a binary representation of the resulting number may be extracted. It should be understood that a number generated from selected bits of a number occurring in the computations may be referred to as the resulting number. Thus, the term "resulting number" also covers any part of a number occurring in the computations.

The method according to the first aspect of the invention is, as discussed above, useful in cryptography, for example in the following implementations: a symmetric encryption algorithm, a public key (or asymmetric key) algorithm, a secure or cryptographic Hash function, or a Message Authentication Code (MAC). These algorithms may, for example, be used in accomplishing one or more of the following tasks:

Ensuring confidentiality of digital data, so as to protect data from unauthorized access.

Ensuring integrity of digital data, so as to ensure that information is accurate or has not been tampered with.

Authorization, e.g. to allow permission to perform certain tasks or operations.

Authentication, such as user authentication, so as to verify the identity of another party, or data origin authentication, so as to verify the origin of the data.

Nonrepudiation, to provide proof of participation in an electronic transaction, for example to prevent that a first person A sends a message to a second person B and subsequently denies that the message has been sent. Digital signatures are used for this purpose. The generation of a digital signature may incorporate the use of a public key algorithm and a hash function.

The method according to the first aspect of the invention is also applicable to a so-called Hash function. A Hash function provides a kind of digital fingerprint wherein a small amount of data serves to identify other data, usually a set of data which is considerably larger than the aforementioned small amount of data. Hash functions are usually public functions wherein no secret keys are involved. Hash functions can also provide a measure of authentication and integrity. They are often essential for digital signature algorithms and for protecting passwords, as a Hash value of a password may be used for password control instead of the password itself, whereby only the hash value and not the password itself needs to be transmitted, e.g. via a communications network.

A Hash function employing a secret key as an input is often referred to as a MAC algorithm or a "keyed Hash function". MAC algorithms are used to ensure authentication and data integrity. They ensure that a particular message came from the person or entity from whom it purports to have come from (authentication), and that the message was not altered in transit (integrity). They are used in the IPsec protocols (cf. RFC 2401 available on http://www.rfc-editor.org on 7 Dec. 2001), for example to ensure that IP packets have not been modified between when they are sent and when they reach their final destination. They are also used in all sorts of interbank transfer protocols.

As discussed above, the method of the first aspect of the invention may be implemented in a Hash or a MAC algorithm. A Hash or a MAC algorithm calculates a checksum of an amount of data of an arbitrary length, and gives the checksum as a result. The process should be irreversible (one-way), and a small change of an input value should result in a significantly different output. Accordingly, the sensitivity to data input should be high.

Whereas a Hash function does not use a key as a seed value, a MAC algorithm uses such a key which represents or determines a seed value for the algorithm, whereby the result depends on the key. Instead of a key, the Hash function relies on a constant value, for example certain bits from the number $\pi$. Alternatively, a part of the data to which the Hash function is applied may be used as a seed value.

A Hash/MAC algorithm may be implemented as follows:

A mathematical system in the form of a logistic map is used in the algorithm, the logistic map having the form: $x_{n+1}=\lambda x_n(1-x_n)$, wherein $\lambda$ is a parameter. Other chaotic systems may be employed, such as the Lorenz system which is discussed in detail hereinafter.

As the result of the algorithm should depend on the message m for which the checksum is to be calculated, the message is incorporated in the system as a component thereof. For example, a kind of coupling between the message and the dynamic variable, x, may be performed as follows: $X_{n+1}=\lambda x_n(1-X_n)+\epsilon(x_n-m_n)$.

The parameters $\lambda$ and $\epsilon$ and the initial value $x_0$ may be predetermined and/or derived from the message. In the case of a MAC algorithm, the parameters $\lambda$ and $\epsilon$ and the initial value $x_0$ may, completely or partially, be determined by the secrete key.

The system is iterated until the end of the message is reached. The last calculated value of x or part thereof, such as the least significant digits, is denoted, for example, the Hash value, the MAC or the checksum. Alternatively, a number of additional iterations may be performed prior to extracting the resulting number. Instead of or in addition to extracting the last calculated value of x, certain bits which have been ignored in the computations may be extracted as the Hash value.

The way of introducing the message, m, into the dynamical system can be varied. As an example, a part of the message may be used to influence the x-variable in each iteration. Such influence may, e.g., be achieved by XORing certain bits of the message into the least significant digits of x.

For further details concerning Hash/MAC functions, reference is made to Applied Cryptography by Bruce Schneier, Second Edition, John Wiley & Sons, 1996.

One possible field of use of the method of the first aspect of the invention is public-key encryption, also referred to as asymmetric algorithms. The key used for decryption is different from the key used for encryption. For example, a key-generation function generates a pair of keys, one key for encryption and one key for decryption. One of the keys is private, and the other is public. The latter may for example be sent in an unencrypted version via the Internet. The encryption key may constitute or contain parameters and/or initial conditions for a chaotic system. A plaintext is used to modulate the chaotic system which is irreversible unless initiated by the private key. For decryption, a mathematical system is used which has dynamics which are inverse to the dynamics of the system used for encryption.

In the method according to the first aspect of the invention, the computations involving the variable expressed as a fixed-point number may possibly include computations on other types of variables, including one or more variables expressed as other kinds of numbers, such as floating point numbers and integer numbers.

The mathematical system may be a discrete or a continuous system. Various types of mathematical systems are discussed below.

The computations may involve at least a first and a second fixed-point number, each fixed-point number having a decimal separator, wherein the decimal separator of the first fixed-point number is positioned at a position different from the position of the decimal separator of the second fixed-point number. The decimal separator of the first and second fixed-point number may be positioned at selected positions.

The resulting number may be expressed as a variable selected from the group consisting of:
an integer number,
a floating point number, and
a fixed-point number.

In general, the mathematical system may comprise one or more differential equations, or one or more discrete maps or mappings. In the case of differential equations, the mathematical system may comprise one or more ordinary differential equations and/or one or more partial differential equations. In the case discrete mappings, the mathematical system may comprise one or more area-preserving maps and/or one or more non area-preserving maps. At least one function of the mathematical system may be non-linear.

The method of the invention is also applicable to other types of functions or equations, including integral equations. The at least one non-linear differential equation or mapping may exhibit chaotic behavior, i.e. it may have at least one positive Lyapunov exponent, in which case the method may comprise computing a Lyapunov exponent at least once during the mathematical computations. In case of a mathematical system exhibiting chaotic behavior, the method of the invention may advantageously be applied in a pseudo-random number generating method, such as in an encryption/decryption method. At least one Lyapunov exponent may be computed at least once during the mathematical computations in order to determine whether the mathematical system exhibits chaotic behavior. If this is not the case, e.g. if the computed Lyapunov exponent is not positive, the computations may be interrupted and resumed from other initial values and/or other parameters.

The at least non-linear differential equation or mapping preferably governs at least one state variable, X, which may be a function of at least one independent variable, t.

More specifically, the mathematical system may comprise one or more of the following systems:
continuous differential equations, including:
partial differential equations, such as the Navier-Stokes equations,
ordinary differential equations, including:
autonomous systems, such as dissipative flows, including the Lorenz system, coupled Lorenz systems, the Rössler system, coupled Rössler systems, hyper chaotic Rössler system, the Ueda system, simplest quadratic dissipative chaotic flow, simplest piecewise linear dissipative chaotic flow Hamiltonian systems, including the N body problem from celestial mechanics, for $N \geq 3$, Non-autonomous systems, including forced systems, such as the forced Duffing's equation, forced negative resistance oscillator, forced Brusselator, forced damped pendulum equation, coupled pendulums, forced double-well oscillator, forced Van de Pol oscillator, delay differential equations, including delay logistic equation, population models, Discrete mappings, including
area preserving as well as non area-preserving maps, including
maps which are piecewise linear in any dimension, such as a tent map, an asymmetric tent map, 2× modulo 1 map, and also the Anosov map, the generalized Baker's map, the Lozi map, as well as higher order generalizations and/or couplings of piecewise linear maps polynomial maps (quadratic or higher), including a logistic map, the Hénon map, higher order generalizations and/or couplings of polynomial map, e.g. N coupled logistic maps, N coupled Hénon maps, Trigonometric maps, including a Sine circle map, a Sine map, the Chirikov standard map, the Sinai map, the standard map, and Higher order generalizations and/or couplings of trigonometric maps, other maps, including the Bernoulli shift, a decimal shift, the Horseshoe map, the Ikeda map, a pastry map, a model of a digital filter, a construction of the Hénon type map in two dimensions from an arbitrary map in one dimension, the DeVogelaere map, Cellular automata,
Neural networks.
The Rössler system referred to above has the form:

$$\frac{dx}{dt} = -y - z$$
$$\frac{dy}{dt} = x + ay$$
$$\frac{dz}{dt} = b + z(x - c)$$

wherein typical parameter values are: a=b=0.2, c=5.7. The Rössler system is described in more detail in O. E. Rössler, Phys. Lett. 57A, 397–398 (1976).

The Hénon map referred to above has the form:

$$\begin{bmatrix} x_{n+1} \\ y_{n+1} \end{bmatrix} = \begin{bmatrix} 1 + y_n - ax_n^2 \\ bx_n \end{bmatrix}$$

wherein typical parameter values are: a=1.4, b=0.3. For more details, see M. Hénon, Commun. Math. Phys. 50, 69–77 (1976).

A logistic map of the form $x_{n+1} = \mu x_n(1-x_n)$ may be employed. The Anosov map, often referred to as the cat map having the form:

$$\begin{bmatrix} x_{n+1} \\ y_{n+1} \end{bmatrix} = \begin{bmatrix} 1 & 1 \\ 1 & 2 \end{bmatrix} \begin{bmatrix} x_n \\ y_n \end{bmatrix} \bmod 1$$

may also be used.

The map is composed of two steps; i) a linear matrix multiplication, ii) a non-linear modulo operation, which forces the iterates to remain within the unit square. It is possible to generalize the Anosov maps to an arbitrary number of variables. Furthermore, the matrix may have arbitrary coefficient only limited by the requirement of being area-preserving and having at least one positive Lyapunov exponent for the system. These exponents can be calculated analytically for such systems. For more details, reference is made to A. J. Lichtenberg and M. A. Lieberman, Regular and Chaotic Dynamics, Springer 1992 (p.305).

Further, a map lattice which is a type of coupled maps may be employed. In the example below, $x_i$ denotes a variable on a lattice (represented by an N-dimensional array of points), the lattice being a 1D array with M points. Each point on the lattice is updated according to the function on the right hand side of the arrow, where the function f may for example be the logistic map. As is seen, neighbouring points on the lattice couple linearly, where the linear coupling is adjusted by the parameters $\gamma$ and $\epsilon$. Boundary conditions refer to the way lattice elements 1 and M are treated.

$$x_i \rightarrow f(x_i) + \epsilon[X_{i-1} - (1+\gamma)x_i + \gamma x_{i+1}] i \in [1,M].$$

Finally, certain simple 3D flow equations may be employed, the systems consist normally of fewer terms than the Lorenz and Rössler systems. That is, either five terms and two nonlinearities or six terms and one nonlinearity. In comparison the Lorenz and Rössler systems each consist of seven terms, cf. J. C. Sprott, Phys. Rev. E 50, R647–R650 (1994). Appropriate systems are given in the below list:

$dx/dt=y$, $dy/dt=-x+yz$, $dz/dt=1-y^2$ $dx/dt=yz$, $dy/dt=x-y$, $dz/dt=1-xy$ $dx/dt=yz$, $dy/dt=x-y$, $dz/dt=1-x^2$ $dx/dt=-y$, $dy/dt=x+z$, $dz/dt=xz+3y^2$ $dx/dt=yz$, $dy/dt=x^2-y$, $dz/dt=1-4x$ $dx/dt=y+z$, $dy/dt=-x+0.5y$, $dz/dt=x^2-z$ $dx/dt=0.4x+z$, $dy/dt=xz-y$, $dz/dt=-x+y$ $dx/dt=-y+Z^2$, $dy/dt=x+0.5y$, $dz/dt=x-z$ $dx/dt=-0.2y$, $dy/dt=x+z$, $dz/dt=x+y^2-z$ $dx/dt=2z$, $dy/dt=-2y+z$, $dz/dt=-x+y+y^2$ $dx/dt=xy-z$, $dy/dt=x-y$, $dz/dt=x+0.3z$ $dx/dt=y+3.9z$, $dy/dt=0.9x^2-y$, $dz/dt=1-x$ $dx/dt=-z$, $dy/dt=-x^2-y$, $dz/dt=1.7+1.7x+y$ $dx/dt=-2y$, $dy/dt=x+Z^2$, $dz/dt=1+y-2x$ $dx/dt=y$, $dy/dt=x-z$, $dz/dt=x+xz+2.7y$ $dx/dt=2.7y+z$, $dy/dt=-x+y^2$, $dz/dt=x+y$ $dx/dt=-z$, $dy/dt=x-y$, $dz/dt=3.1x+y^2+0.5z$ $dx/dt=0.9y$, $dy/dt=0.4+z$, $dz/dt=xy-z$ $dx/dt=-x-4y$, $dy/dt=x+Z^2$, $dz/dt=1+x$

The Lorenz system comprises the following differential equations:

$$\frac{dx}{dt} = \sigma(y-x),$$

$$\frac{dy}{dt} = rx - y - xz,$$

$$\frac{dz}{dt} = xy - bz,$$

wherein $X=(x, y, z)$ are state variables, t is the independent variable, and $\sigma$, r and b are parameters.

In case the following conditions are fulfilled:

$$(\sigma - b - 1) > 0, r > 1, r > \sigma \frac{(\sigma+b+3)}{(\sigma-b-1)}, \sigma, r, b > 0,$$

the stationary points of the Lorenz system are not stable, in which case the Lorenz system is likely to exhibit chaotic behavior. The parameters may be constant or variable, variable parameters contributing, e.g., to the results of the computations being more unpredictable which may be useful in a pseudo-random number generating method or in an encryption/decryption method.

In the case of a non-linear mapping, the computations may comprise numerically iterating the non-linear function, the iteration being based on an initial condition $X_0$ of the state variable X.

The step of performing computations may comprise numerically integrating the non-linear differential equations by repeatedly computing a solution $X_{n+1}$ based on one or more previous solutions $X_m$, $m \leq n+1$, and a step length, $\Delta T_n$, of the independent variable, t. Preferably, at least one initial condition, $X_0$, of the state variable, X, and an initial step length, $\Delta T_0$, are provided. The step length may be given before the computations are initiated, or it may be computed as the computations proceed. For example, the initial step length, $\Delta T_0$, may be computed from the initial condition $X_0$.

In a discretized formulation of the Lorenz system, the solution $X_{n+1}$ may be computed using the step length $\Delta T = (\Delta t_{x,n}, \Delta t_{y,n}, \Delta t_{z,n})$ as follows:

$x_{n+1} = x_n + (\sigma(y_n - x_n)) \cdot \Delta t_{x,n}$ $y_{n+1} = y_n + (x_n(r-z_n) - y_n) \cdot \Delta t_{y,n}$ $z_{n+1} = z_n + (x_n y_n - b z_n) \cdot \Delta t_{z,n}$, wherein:

$\Delta t_{x,n}$ is the step length used in the computation of $x_{n+1}$,
$\Delta t_{y,n}$ is the step length used in the computation of $y_{n+1}$,
$\Delta t_{z,n}$ is the step length used in the computation of $z_{n+1}$.

As mentioned above, the step length $\Delta T$ may be constant or may vary throughout the computations. For example, in each or in some of the integration steps, at least one of the elements ($\Delta t_{x,n}, \Delta t_{y,n}, \Delta t_{z,n}$) of the step length $\Delta T$ may be a function of one or more numbers involved in or derived from the computations. Also, in each integration step, at least one of the elements ($\Delta t_{x,n}$, $\Delta t_{y,n}$, $\Delta t_{z,n}$) of the step length $\Delta T$ may be a function of at least one solution, $X_m$, which is a current or previous solution to the mathematical system. In each or some of the integration steps, at least one of the elements ($\Delta t_{x,n}$, $\Delta t_{y,n}$, $\Delta t_{z,n}$) of the step length $\Delta T$ is a function of at least one step length, $\Delta T_m$, which is a current or previous integration step. The varying step length $\Delta T$ may be used not only in the method according to the invention but in any numerical solution of differential equations, and accordingly the present invention also relates to—as an independent aspect—a method of numerically solving differential equations using a variable step length. In a pseudo-random number generating method, such as in an encryption/decryption method, the variable step length may contribute to improving the security of the system, i.e. to make the resulting keystream more unpredictable.

In a pseudo-random number generating method, the initial condition $X_0$ and/or the initial step length $\Delta T_0$ may be calculated from or represent a seed value. In an encryption/decryption method, at least a part of the initial condition $X_0$ and/or at least a part of the initial step length $\Delta T_0$ may be calculated from or represent an encryption key. Also, at least a part of at least some of the parameters of the mathematical system may be calculated from or represent a seed value or an encryption key. The key may be a public or a private key.

The extracted set of data may comprise a pseudo-random number which may be used for encryption. A plurality of numbers resulting from the computations may be extracted. The step of extracting may comprise extracting one or more numbers derived from a number, k, of bits of the resulting number, such as the k least significant bits from the resulting number or numbers, which contributes to the unpredictability of the derived number. The k bits extracted may for example be derived by applying a modulus or a logical "and" function to the resulting number or numbers. As an alternative to extracting the k least significant bits, the step of extracting may comprise extracting k bits at predetermined or variable positions in the resulting number. The number k may be an integer value selected from in the range between 8 and 128, such as 16–64, such as 24–32. In case a plurality of numbers are extracted, the extracted numbers may be derived by means of different values of k, which further contributes to the unpredictability of the derived number. The extracted number or numbers may be manipulated by means of arithmetic and/or logical operations, so as to obtain a combined set of data. One or more of the extracted numbers and/or the combined set of data may be combined with original data in an arithmetic and/or logical operation, so as to encrypt the original data. Similarly, one or more of the extracted numbers and/or the combined set of data may be combined with encrypted data in a arithmetic and/or logical operation, so as to decrypt the encrypted data and obtain the original data. The arithmetic and/or logical operation may comprise an XOR operation, multiplication or addition. For example, the arithmetic and/or logical operation may comprise addition of the original data and the combined set of data for encryption, and subtraction of the combined set of data from the encrypted data for decryption. Alternatively, the arithmetic and/or logical operation comprises subtraction of the combined set of data from the original data for encryption, and addition of the combined set of data and the encrypted data for decryption. It may be necessary to apply a modulus function when subtracting or adding numbers. In case the extracted set of data comprises data derived from a plurality of numbers, one set of bits, for example the k least significant bits may be extracted from one number, whereas other bits, for example the 47th–54th bit in a 64-bit number, may be extracted from the other number.

In a block-cipher encryption/decryption system, the computations may involve data representing a block of plaintext, so that the plaintext and a key is entered into, e.g., an encryption system which gives the ciphertext as an output. The extracted set of data may be used to define at least one operation on a block of plaintext in the block-cipher encryption and decryption system. The method of the first aspect of the invention may be applied in a block-cipher algorithm, wherein a block of plaintext is divided into two sub-blocks, and one sub-block is used to influence the other, for example where a modified version of a first block (or a part thereof) is used to influence the other (or a part thereof), e.g., by an XOR function. Such an algorithm is generally referred to as a Feistel Network, cf. Applied Cryptography by Bruce Schneier, Second Edition, John Wiley & Sons, 1996. In such case the first sub-block or the modified version thereof may be transformed by a Hash function relying on the method, the Hash function being given a cryptographic key as an input. In each round, a new cryptographic key may be given as input to the Hash function. Alternatively, the same cryptographic key may be given to the Hash function in all rounds. As a further alternative, the cryptographic key may vary from block to block, for example by giving the same cryptographic key as an input in all rounds for each block, or by giving different cryptographic keys as inputs for each block and for each round.

The extracted data may be used as a decryption or an encryption key. In a system, wherein computations are performed in two mathematical systems, the extracted set of data from one of the systems may be used to generate keys or used as keys for the other system. The extracted data may also be used in generation of data representing a digital signature, and/or in watermarking of digital data.

In the method according to the first aspect of the invention, the electronic device may comprise an electronic processing unit having a register width, whereby the method may comprising the steps of:
  expressing at least one integer number of a bit width larger than said register width as at least two sub-numbers each having a bit width which is at most equal to said register width,
  performing at least one of said computations as a sub-computation on each of the sub-numbers so as to arrive at at least two partial results, expressed as integer numbers of a bit width smaller which is at most equal to the register width of the processing unit,
  concatenating the partial results to yield a representation of a result of said at least one computation.

Analogously, computations on numbers of a width smaller than the register width of the processor may also be performed, whereby an operation, for example a logical AND, may be performed, so that the upper half of, e.g., a 64-bit register is not used for computations on 32-bit numbers. In order to maintain the sign of the number in question, the most significant bit of, e.g., the 32-bit number may be copied into the upper 32 bits of the 64-bit register.

The integer numbers usually comprise or represent the fixed-point number or numbers used in the computations. A fixed-point number expressed in terms of an integer type number may represent a real number.

It should be understood that the method according to the first aspect of the invention may be combined with any of the steps discussed below in connection with other aspects of the invention.

The invention also relates to a computer program for performing numerical computations in a mathematical system comprising at least one function, the computer program being adapted to:
- express the mathematical system in discrete terms,
- express at least one variable of the mathematical system as a fixed-point number,
- perform said computations in such a way that the computations include the at least one variable expressed as a fixed-point number,
- obtain, from said computations, a resulting number, the resulting number representing at least one of:
  - a. at least a part of a solution to the mathematical system, and
  - b. a number usable in further computations involved in the numerical solution of the mathematical system, the computer program being further adapted to:
- extract a set of data which represents at least one of:
  - i. a subset of digits of the resulting number, and
  - ii. a subset of digits of a number derived from the resulting number.

The computer program may further be adapted to perform any of the operations and method steps discussed in the present text. The invention also relates to a computer readable data carrier loaded with such a computer program, and to a computer comprising or being connected to such a computer readable data carrier, the computer comprising processor means for running the program.

The invention also relates to a signal comprising an extracted set of data which have been derived from computations in a mathematical system, wherein, in order to arrive at the extracted set of data:
- the mathematical system has been expressed in discrete terms,
- at least one variable of the mathematical system has been expressed as a fixed-point number,
- said computations have been performed in such a way that the computations have included the at least one variable expressed as a fixed-point number,
- a resulting number has been obtained from said computations, the resulting number representing at least one of:
  - a. at least a part of a solution to the mathematical system, and
  - b. a number usable in further computations involved in the numerical solution of the mathematical system, whereby the extracted set of data represents at least one of:
- i. a subset of digits of the resulting number, and
- ii. a subset of digits of a number derived from the resulting number.

The invention further relates to a signal comprising an encrypted set of data which has been derived as a combination of plaintext and at least one set of data extracted from computations in a mathematical system, wherein, in order to arrive at the extracted set of data:
- the mathematical system has been expressed in discrete terms,
- at least one variable of the mathematical system has been expressed as a fixed-point number,
- said computations have been performed in such a way that the computations have included the at least one variable expressed as a fixed-point number,
- a resulting number has been obtained from said computations, the resulting number representing at least one of:
  - a. at least a part of a solution to the mathematical system, and
  - b. a number usable in further computations involved in the numerical solution of the mathematical system, whereby the extracted set of data represents at least one of:
- i. a subset of digits of the resulting number, and
- ii. a subset of digits of a number derived from the resulting number.

It should be understood that any data derived from any method and/or computer program of the present invention and any signal containing such data are also covered by the scope of the appended claims. It should further be understood that any feature, method step, or functionality described below in connection with the further aspects of the invention discussed below may be combined with the method of the first aspect of the invention.

In a second aspect, the present invention relates to a method of detecting periodic behavior in the solution of a mathematical system comprising at least one non-linear function governing at least one state variable with respect to at least one independent variable, the method comprising:
- expressing the mathematical system in discrete terms,
- performing computations so as to obtain resulting numbers, the resulting numbers representing at least parts of solutions to the mathematical system,
- storing selected solutions in an array, A, in a memory of the electronic device, the array being adapted to store a finite number, n+1, of solutions,
- determining whether at least one of:
  - a current solution, and
  - a particular one of said solutions stored in the array is substantially identical to another solution stored in the array.

The steps of performing computations, storing selected solutions, and determining may be performed continuously during the computations, i.e. repetitively during the computations, such as in each computational step, such as in connection with each iteration.

If a current solution or a particular one of the solutions stored in the array is substantially identical to one or more other solutions stored in the array the solution of the mathematical system is likely to show periodic behavior. In case the method according to the second aspect of the invention is used in a pseudo-random number generating method, in particular if it is used in an encryption/decryption method, such periodic behavior is undesirable, as it negatively influences the unpredictability of the generated pseudo-random numbers or the keystream. By applying the above method, periodic behavior may be detected.

The step of determining whether a current solution or a particular one of the solutions stored in the array is substantially identical to one or more other solutions stored in the array preferably comprises determining whether the solutions are completely identical. When solving a mathematical system expressing an array of state variables X, the step of determining may comprise determining whether only some of the entries of X are substantially identical.

In order to save computational time and/or memory, only selected solutions may be stored in the memory.

In the method, each entry in the array may contain a solution having an age which is growing by array level, $A_i$, $0<i<n$, and the method may comprise:
- at the step of storing selected solutions in the array:
  storing a current solution at the 0'th level, $A_0$, in the array, A, thereby overwriting an old value stored at the 0'th level in the array, A,
- if a 0'th predetermined criterion is fulfilled: transferring the old value to the 1'st level in the array, A, before the 0'th level is overwritten by the current solution, and for the 1st level and each further level i in the array:
- if an i'th predetermined criterion for level i is fulfilled: transferring the old value stored at the i'th level to the i+1'st level in the array, A, before the i'th level is overwritten by the value transferred from the i-1'st level, if the n'th level is to be updated: discarding the old value previously stored at the n'th level.

For each level, i, in the array, the number of times an old value stored at the i'th level has been overwritten by a new value without the old value being transferred to the i+1'st level may be counted, the i'th predetermined criterion being fulfilled if the old value has not been transferred for a predetermined number of times. The predetermined number of times may be the same for all levels of the array, A, or it may vary between the levels. The predetermined number of times for the i'th level of the array, A, may for example be dependent on one or more values stored in the array, such as when there occurs a change of sign in one or more of the values.

The step of
- determining whether a current solution or a particular one of said solutions stored in the array is substantially identical to one or more other solutions stored in the array may only be performed when a test criterion is fulfilled. For example, the test criterion may be fulfilled when the sign of at least one state variable changes from + to −, or from − to +, or both. The test criterion may also be fulfilled when there occurs a change of sign of at least one derivative of at least one state variable with respect to at least one independent variable, in which case the method further comprises computing the derivative.

In the method, a test value may be computed from the at least one state variable and/or from the derivative, the test criterion being based on the test value. The test criterion may for example be fulfilled when there occurs a change of sign in the test value or in a derivative of the test value, or predetermined values may be provided.

The step of performing computations may be performed by applying the method of the first aspect of the invention, and any step discussed in relation to the first aspect of the invention as well as any step discussed below in connection with the methods of the further aspects of the invention may be incorporated.

In a third aspect, the present invention relates to a method of generating a pseudo-random number, the method comprising:

I) expressing a mathematical system in discrete terms,
II) defining a seed value representing at least an initial condition for the mathematical system,
III) expressing at least one variable of the mathematical system as a fixed-point number,
IV) performing computations including the at least one variable expressed as a fixed-point number and obtaining, from said computations, a resulting number, the resulting number representing at least one of:
  a. at least a part of a solution to the mathematical system, and
  b. a number usable in further computations involved in the numerical solution of the mathematical system,
V) extracting, as the pseudo-random number, a number derived from at least one number which has occurred during the computations.

The seed value may be a user-defined value, such as an encryption/decryption key in case the method is applied in an encryption/decryption method.

The pseudo-random number may be extracted as a number derived from the k digits of the one or more numbers which have occurred during the computations, e.g. the k least significant bits or k selected bit from the one or more numbers.

The method may comprise repeating steps IV) and V) until a given amount of pseudo-random numbers has been generated.

A given amount of pseudo-random numbers may be generated and stored in a memory of the electronic device as a spare seed value, which may, e.g., be used if periodic behavior is detected by the method according to the second aspect of the invention or by another method. The given amount of pseudo-random numbers may be stored internally in an algorithm.

The method may further comprise a method for detecting periodic behavior according to the second aspect of the invention as discussed above. In that case the method for generating a pseudo-random number according to the third aspect of the invention may comprise, if the step of:
- determining whether a current solution or a particular one of said solutions stored in the array is substantially identical to one or more other solutions stored in the array reveals that the current solution or the particular solution is identical to one or more other solutions,
- interrupt the pseudo-random-number generation, i.e. interrupting repetition of steps IV) and V),
- use the spare seed value as the seed value in the step II),
- resume the pseudo-random-number generation, i.e. resuming repetition of steps IV) and V).

Thus, for example, in an encryption/decryption method, a spare encryption/decryption key may be used if periodic behavior is detected.

Prior to the step of resuming the pseudo-random number generation, a given amount of pseudo-random numbers may be generated and stored, in a memory of the electronic device, as a new spare seed value. Each level in the array, A, is preferably reset prior to step IV), when steps IV) and V) are initiated with a new seed value at step II).

The method according to the third aspect of the invention may comprise the steps described above in connection with the first aspect of the invention and/or the steps described below in connection with the further aspects of the invention.

In a fourth aspect, the invention relates to a method of encrypting a set of original data into a set of encrypted data, the method comprising the steps of:

A) generating a pseudo-random number by performing the steps of:
  I) expressing a mathematical system in discrete terms,
  II) defining an encryption key representing at least an initial condition for the mathematical system,
  III) expressing at least one variable of the mathematical system as a fixed-point number,
  IV) performing computations including the at least one variable expressed as a fixed-point number and obtaining, from the computations, a resulting number, the resulting number representing at least one of:
    a. at least a part of a solution to the mathematical system, and
    b. a number usable in further computations involved in the numerical solution of the mathematical system, V) extracting, as the pseudo-random number, a number derived from at least one number which has occurred during the computations, B) manipulating the original data and the pseudo-random number by means of at least one of:
i. an arithmetic operation, and
ii. a logical operation, so as to obtain a combined set of data, the combined set of data being the encrypted data.

Prior to step A), a sub-set of the original data may be separated from the set of data, and step B) may be performed on the sub-set of data. This step may be repeated until a plurality of sub-sets which in common constitute the entire set of original data have been encrypted.

The pseudo-random number may be extracted as a number derived from the k bits of the one or more numbers which have occurred during the computations, e.g. the k least significant bits or k selected bits.

Steps IV) and V) may be repeated until a given amount of pseudo-random numbers has been generated.

A given amount of pseudo-random numbers may be generated and stored in a memory of the electronic device as a spare encryption key. For example, a number resulting from or occurring in at least one integration or iteration step of the computations may be stored as a spare encryption key. The spare encryption key may, e.g., be used if encryption is interrupted due to the occurrence of periodic behavior in the solution to the mathematical system. In case no output of the spare encryption key is needed, it may be stored internally in an encryption algorithm. When the method is used for decryption, the spare key is a decryption key.

As it appears from the above, the method may comprise a method for detecting periodic behavior according to the second aspect of the invention, in which case the method for encrypting according to the fourth aspect of the invention may comprise, if the step of determining whether a current solution or a particular one of said solutions stored in the array is substantially identical to one or more other solutions stored in the array reveals that the current solution or the particular solution is identical to one or more other solutions, interrupt the pseudo-random number generation, i.e. interrupting repetition of steps IV) and V),
use the spare encryption key as the encryption key in step II),
resume the pseudo-random number generation, i.e. resuming repetition of steps IV) and V).

Prior to the step of resuming the pseudo-random number generation, a given amount of pseudo-random numbers may be generated and stored in a memory of the electronic device as a new spare encryption key.

Preferably, each level in the array, A, is reset prior to step IV), when steps IV) and V) are initiated with a new seed value at step II).

The method for encrypting according to the fourth aspect of the invention may further comprise any of the steps discussed above in connection with the methods of the first, second and third aspects of the invention, and/or any of the steps discussed below in connection with the further aspects of the invention.

In a fifth aspect, the invention relates to a method of decrypting a set of encrypted data which has been encrypted by the method according to the fourth aspect of the invention, the method of decrypting according to the fifth aspect comprising the steps of:

a) performing step A) as defined above in connection with the encryption method, so as to extract the same pseudo-random number as extracted in step V) of the encryption method, b) manipulating the encrypted data and the pseudo-random number by means of arithmetic and/or logical operations, so as to obtain the original, i.e. decrypted, version of the data.

Prior to step a), a sub-set of the encrypted data may be separated from the set of encrypted data, and in case the sub-set of data has been encrypted by the above encryption method, the method of decrypting may comprise performing steps a) and b) on the sub-set of data. This step may be repeated until a plurality of sub-sets which in common constitute the entire set of encrypted data have been decrypted.

Any of the steps of the encryption method may be applied in an identical manner when decrypting the encrypted data as during the previous sequence of encrypting the original data.

Any steps discussed above in connection with the first, second, third and fourth aspects of the invention may further be applied in the method of decrypting according to the fourth aspect of the invention. Further, the step of the fifth aspect of the invention may be incorporated in the further aspects of the invention discussed below.

In a sixth aspect, the present invention relates to a computer program for encrypting and decrypting a set of data, the computer program being adapted to run in an encryption mode and in a decryption mode, the computer program being further adapted to:

i) generate a pseudo-random number in a reproducible way by performing the steps of:
  expressing a mathematical system in discrete terms,
  expressing at least one variable of the mathematical system as a fixed-point number,
  performing computations including the at least one variable expressed as a fixed-point number,
  obtaining, from the computations, a resulting number, the resulting number representing at least one of:
  a. a part of a solution to the mathematical system, and
  b. a number usable in further computations involved in the numerical solution of the mathematical system,
  extracting, as the pseudo-random number, a number derived from at least one number which has occurred during the computations, ii) manipulate the data and the pseudo-random number by means of at least one of:
  an arithmetic operation, and
  a logical operation, so as to obtain a combined set of data, wherein:
  the combined set of data represents an encrypted version of the data in case the computer program is run in encryption mode, the combined set of data represents a decrypted version of the data in case the computer program is run in decryption mode.

The step of manipulating may comprise any logical and/or arithmetic function described above. In case an XOR operator is used for manipulating the data, the encryption and decryption modes may comprise identical steps.

The step of generating a pseudo-random number may further comprise any of the steps discussed above in connection with the method according to the third aspect of the invention.

The computer program of the sixth aspect of the invention may be adapted to perform any step discussed above with the first, second, third, fourth and fifth aspects of the invention, as well as any step discussed below in connection with the further aspects of the invention.

The invention further relates to a computer readable data carrier loaded with a computer program according to the sixth aspect of the invention, and to a computer comprising or being connected to such a computer readable data carrier, the computer comprising processor means for running the program.

In a seventh aspect, the invention relates to a method of generating a pseudo-random number, the method comprising, in one instance:

I) expressing a mathematical system in discrete terms,
II) defining a seed value representing at least an initial condition for the mathematical system,
III) expressing at least one variable of the mathematical system as a fixed-point number,
IV) performing computations including the at least one variable expressed as a fixed-point number and obtaining a resulting number, the resulting number representing at least one of:
a. a part of a solution to the mathematical system, and
b. a number usable in further computations involved in the numerical solution of the mathematical system,
V) extracting, as the pseudo-random number, a number derived from at least one number which has occurred during the computations, performing steps I)–V) in a plurality of instances in parallel.

Computations in the two or more instances may be performed either at the same time, or successively. Thus, the computations in the two or more instances may be performed by executing instructions which process a plurality of computations at the same time, or by executing instructions which only process a single computation at a time.

Thus, pseudo-random number generation in a plurality of instances in parallel may, in some cases, be faster than if the steps are performed in one instance only, in particular if the hardware on which the method is executed supports parallel processing. Further, by coupling the two or more instances, a larger key length in encryption may be applied than if only one instance were used. For example, one part of an encryption key may be used for a first instance, and another part of the encryption key may be used for a second instance.

Mathematical systems of arbitrarily high dimension may be constructed by coupling systems of lower dimension. For example, N logistic maps can be coupled, yielding an N-dimensional system. The coupling mechanism can be engineered by including either linear or non-linear coupling functions in the N different maps corresponding to the N different variables. The coupling function in the map governing one variable may or may not depend on all other variables. Alternatively, the coupling can be carried out by substituting one of the N variables into one or more of the N−1 remaining maps.

Two or more logistic maps may be coupled through linear coupling terms. In the example shown below, the parameters $\epsilon_1$ and $\epsilon_2$ in front of the coupling terms control the strength of the coupling, i.e. the degree of impact that each one of the two logistic maps has on the other one.

$$\begin{bmatrix} x_{n+1} \\ y_{n+1} \end{bmatrix} = \begin{bmatrix} \lambda_1 x_n (1 - x_n) + \varepsilon_1 (y_n - x_n) \\ \lambda_2 y_n (1 - y_n) + \varepsilon_2 (x_n - y_n) \end{bmatrix}$$

Numbers or data may be transmitted between the plurality of instances at least while performing step IV) for each of the instances. The same applies to step V).

The method may comprise combining, by use of arithmetic and/or logical operations, a plurality of pseudo-random numbers extracted at step V) in each of the instances into a common pseudo-random number.

Parameter and/or variable values, or parts thereof, may be exchanged between the two instances. Thus, for example $x_{n+1}$ of one instance and $x_{n+1}$ of another instance may be exchanged after each iteration step, or $x_{n+1}$ of one instance may be exchanged with $y_{n+1}$ of another instance. Likewise, the step length $\Delta t_n$ may be exchanged between the two instances. The exchange of variable or parameter values may also be achieved by performing logical and/or arithmetic operations on a value of a first instance before using that value for modifying a value of a second instance.

The method according to the seventh aspect of the invention may comprise any step discussed above or below in connection with the other aspects of the invention.

In an eighth aspect, the invention relates to a method of performing numerical computations in a mathematical system comprising at least one function, the method comprising the steps of:

expressing the mathematical system in discrete terms,
expressing at least one variable of the mathematical system as a fixed-point number,
performing said computations in such a way that the computations include the at least one variable expressed as a fixed-point number,
obtaining, from said computations, a resulting number, the resulting number representing at least one of:
a. at least a part of a solution to the mathematical system, and
b. a number usable in further computations involved in the numerical solution of the mathematical system, the step of performing computations comprising:
repeatedly computing a solution $X_{n+1}$ based on at least one previous solutions $X_m$, m<n+1, whereby the step of performing computations is initiated based on at least one initial condition, $X_0$, of the state variable, X, the method further comprising:
providing a cryptographic key as an input to said computations, whereby the cryptographic key is used in generation of the initial condition $X_0$.

It should be understood, that, in the present context, the term "previous solutions" also covers the current solution, $X_{n+1}$.

Any and all comments and discussions herein set forth in connection with the other aspects of the invention also applies to the method of the eighth aspect of the invention.

In a ninth aspect, the invention relates to a method of determining an identification value for identifying a set of data, the method comprising performing numerical computations in a mathematical system comprising at least one function, the method comprising the steps of:

expressing the mathematical system in discrete terms,
expressing at least one variable of the mathematical system as a fixed-point number,
performing said computations in such a way that the computations include the at least one variable expressed as a fixed-point number,
obtaining, from said computations, a resulting number, the resulting number representing at least one of:
a. at least a part of a solution to the mathematical system, and
b. a number usable in further computations involved in the numerical solution of the mathematical system, whereby a representation of at least part of the set of data is used in said computations, the method further comprising:

extracting, as said identification value, at least a part of said resulting number.

Thus, the method of the ninth aspect of the invention may be regarded a Hash function or Hash algorithm which have been discussed in detail above. The identification value may be constituted by a number of extracted numbers which have been extracted at different computational stages in the numerical computations. Extraction may occur at each computational step or at each iteration step, or it may occur only at selected computational stages.

The term "identification value" may be a hash value or a cryptographic check-sum which identifies the set of data, cf. for example Applied Cryptography by Bruce Schneier, Second Edition, John Wiley & Sons, 1996. In case a cryptographic key is used as a seed value for the computations, the hash function is referred to as a MAC function (Message Authentication Code).

The mathematical system may comprise a differential equation, such as a partial differential equation or an ordinary differential equation, or a discrete mapping, such as an area-preserving map or a non area-preserving map. The mathematical system may comprise at least one non-linear mapping function governing at least one state variable X.

A non-linear mapping function may for example comprise a logistic map of the form $x_{n+1}=\lambda x_n(1-x_n)$, wherein $\lambda$ is a parameter, $x_{n+1}$ is the value of state variable x at the (n+1)'th stage in the computations, and $x_n$ is the value of state variable x at the n'th stage in the computations.

The logistic map may be modified into the form $x_{n+1}=\lambda x_n(1-x_n)+\epsilon(x_n-m_n)$, wherein $\lambda$ and $\epsilon$ are parameters, $x_{n+1}$ is the value of state variable x at the (n+1)'th stage in the computations, $x_n$ is the value of state variable x at the n'th stage in the computations, and $m_n$ contains a representation of an n'th portion of the set of data.

A cryptographic key may be used for at least partially determining at least one of the following: $\lambda$, $\epsilon$ and an initial value $x_0$ of state variable x.

The mathematical system may comprise a set of non-linear mapping functions, such as:

an Anosov map of the form:

$$\begin{bmatrix} x_{n+1} \\ y_{n+1} \end{bmatrix} = \begin{bmatrix} 1 & 1 \\ 1 & 2 \end{bmatrix} \begin{bmatrix} x_n \\ y_n \end{bmatrix} \mod 1, \text{ or}$$

a Hénon map of the form:

$$\begin{bmatrix} x_{n+1} \\ y_{n+1} \end{bmatrix} = \begin{bmatrix} 1+y_n-ax_n^2 \\ bx_n \end{bmatrix}.$$

The mathematical system may comprise at least one non-linear differential equation and/or a set of non-linear differential equations.

Preferably, the mathematical system has at least one positive Lyapunov exponent, whereby a certain degree of irregular or chaotic behavior is achieved, whereby randomness properties of the system and security are enhanced.

At least one Lyapunov exponent may be computed at least once during the mathematical computations in order to determine whether the mathematical system exhibits chaotic behavior. If this is not the case, e.g. if the computed Lyapunov exponent is not positive, the computations may be interrupted and resumed from other initial values and/or other parameters.

The at least non-linear differential equation preferably governs at least one state variable, X, which is a function of at least one independent variable, t. The set of non-linear differential equations may for example comprise a Lorenz system.

Any and all comments and discussions herein set forth in connection with the other aspects of the invention also applies to the method of the ninth aspect of the invention.

In a tenth aspect the present invention relates to a method of, performing numerical computations in a mathematical system comprising at least one function, the method comprising the steps of:

expressing the mathematical system in discrete terms, restricting the range of at least a selected variable of said function, the range being sufficiently narrow so as to exclude values which the selected variable, by virtue of said function, would assume if not restricted by said range, performing computations so as to obtain a resulting number, the resulting number representing at least one of:

a. a part of a solution to the mathematical system, and b. a number usable in further computations involved in the numerical solution of the mathematical system, when the computations result in a value for the selected variable which is beyond the range, assigning a value within the range to the selected variable.

For example, if the upper bits of the value, which is beyond the range, are truncated, the step of assigning a value within the range may be seen as a modulus function. The steps of the method of the tenth aspect of the invention may thus provide deliberate overflow, e.g. in order to enhance randomness properties of an encryption/decryption system and/or in order to make it more difficult to derive information about internal states of the mathematical system from encrypted data.

Any and all comments and discussions herein set forth in connection with the other aspects of the invention also applies to the method of the ninth aspect of the invention. In particular, any and all comments set forth in connection with encryption and decryption apply, and the method of the tenth aspect of the invention analogously applies to any and all aspects of the present invention, in particular to aspects related to encryption and decryption.

The method of the tenth aspect of the invention may thus be a part of a pseudo-random number generating method which, e.g., generates pseudo-random numbers for use in at least one of encryption and decryption. The mathematical system preferably has at least one positive Lyapunov exponent.

In an eleventh aspect, the present invention provides a method of performing numerical computations in a mathematical system comprising at least one function, the method comprising the steps of:

expressing the mathematical system in discrete terms, expressing at least one variable of the mathematical system as an integer number, placing an imaginary decimal separator in said integer number, whereby the integer number represents a real number, performing computations including the at least one variable expressed as an integer number so as to obtain a resulting number, the resulting number being expressed as an integer number, positioning the imaginary decimal separator in the resulting number at a predetermined position by performing at least one of the steps of:
  correcting the position of the imaginary decimal separator in the integer number, and
  placing an imaginary separator in the resulting number.

The resulting number is usually a fixed-point number having a fixed position of the decimal separator. Alternatively, the position of the decimal separator in the resulting number may be corrected after the computation has been completed. A third possibility is to correct the position of the decimal separator before and after performing the computation. This may be relevant if not all positions to the left of the decimal separator in the resulting number are used, and it is desired to maintain a relatively higher resolution in the computations than the resolution of the resulting number. For example, the resulting number is desired to have a S(10.21) format. Thus, the addition of, say, two S(7.24) format numbers may be performed in a S(8.23) format which then is converted to the S(10.21) format resulting number. Thereby, the carry from the second and third least significant bits in the arguments may influence the result.

Finally, for some computations no correction of the position of any decimal separator may be required or needed.

The correction of the position of a decimal separator are usually performed by means of shift operations.

Any and all comments and discussions herein set forth in connection with the other aspects of the invention also applies to the method of the ninth aspect of the invention.

In a twelfth and broadest aspect, the present invention provides a method of performing numerical computations in a mathematical system comprising at least one function, the method comprising the steps of:
  expressing the mathematical system in discrete terms,
  expressing at least one variable of the mathematical system as a fixed-point number,
  performing said computations in such a way that the computations include the at least one variable expressed as a fixed-point number,
  obtaining, from said computations, a resulting number, the resulting number representing at least one of:
  a. at least a part of a solution to the mathematical system, and
  b. a number usable in further computations involved in the numerical solution of the mathematical system.

Any and all comments and discussions herein set forth in connection with the other aspects of the invention also applies to the method of the ninth aspect of the invention.

In a thirteenth aspect, the invention provides a circuit for performing numerical computations in a non-linear mathematical system comprising at least one function, the circuit being designed or programmed so that the mathematical system, in the circuit or in the computer program code, is represented in modified terms in such a way that at least a selected one of the numerical computations involves an integer operation, whereby said selected numerical computation in a non-modified representation of the mathematical system would require one or more floating point operations or controlling the positioning of a decimal separator in one or more fixed-point numbers, the circuit being designed or programmed so that said selected computation is substituted by at least one substitute computation on one or more integer numbers, whereby the mathematical system, in the circuit or in the computer program code, is represented in such a way that the at least one substitute computation requires no positioning of an imaginary decimal separator.

The mathematical system may exhibit chaotic behavior.

Thus, for example, the computations:

$$x_{n+1}=x_n+y_n \text{ and}$$

$$y_{n+1}=x_n+2y_n$$

may be performed by first computing $x_{n+1}$. Then, the expression for $y_{n+1}$ may be computed as:

$$y_{n+1}=x_{n+1}+y_n$$

whereby the computational step of multiplying $y_n$ by 2 may be omitted.

Thus, by performing the substitute computations, computational time may be saved.

Likewise, the invention also provides method of, in an electronic circuit, performing numerical computations in a non-linear mathematical system comprising at least one function, the method comprising, in the circuit or in a computer program segment according to which the circuit operates, the steps of:
  representing the mathematical system in modified terms in such a way that at least a selected one of the numerical computations involves an integer operation, whereby said selected numerical computation in a non-modified representation of the mathematical system would require one or more floating point operations or controlling the positioning of a decimal separator in one or more fixed-point numbers,
  substituting said selected computation by at least one substitute computation on one or more integer numbers, whereby the mathematical system, in the circuit or in the computer program code, is represented in such a way that the at least one substitute computation requires no positioning of an imaginary decimal separator, performing said substitute computation.

DETAILED DESCRIPTION OF THE DRAWINGS

Figure 1:
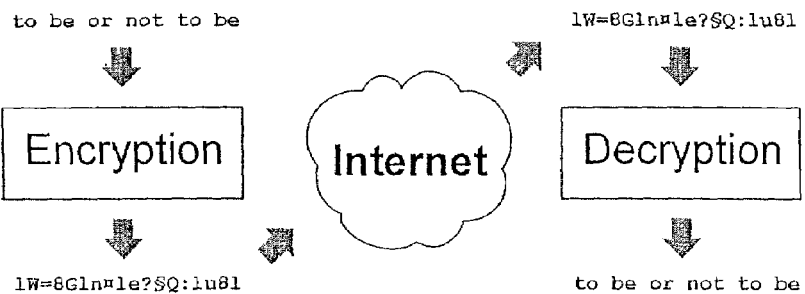
FIG. 1 is an illustration of a sequence for encrypting, transmitting and decrypting electronic data.
Figure 2:
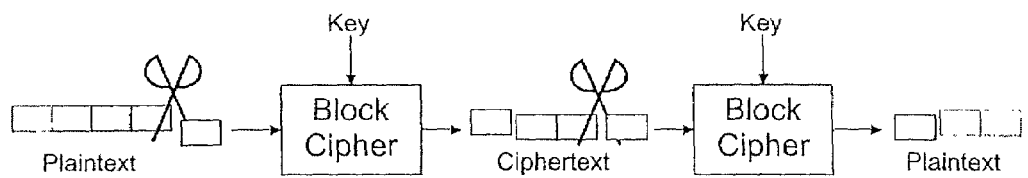
FIG. 2 is an illustration of an encryption sequence in a block cipher system.
Figure 3:
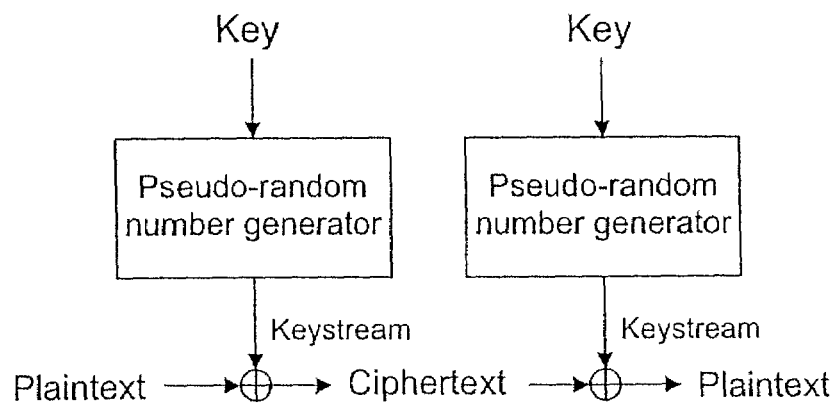
FIG. 3 is an illustration of an encryption sequence in a stream cipher system.

FIG. 1 is a general illustration of a sequence for encrypting, transmitting and decrypting digital data. FIG. 2 is an illustration of an encryption sequence in a block cipher system, and FIG. 3 is an illustration of an encryption sequence in a stream cipher system, block cipher and stream cipher systems being discussed in the above discussion of the background of the invention.

A method and algorithm for encrypting/decrypting data will now be described as a preferred embodiment of the various aspects of the invention. The algorithm is applicable for most purposes in data encryption/decryption. However, the nature of the algorithm favours encryption of data streams or other continuous data, such as large files, live or pre-recorded audio/video, copyrighted material (e.g. computer games or other software) and data for storage (e.g. backup and/or transportation). Furthermore, the speed of the algorithm makes it particularly suitable for these purposes. Because of the calculation method, the algorithm is also useable on very small processors.

Figure 4:
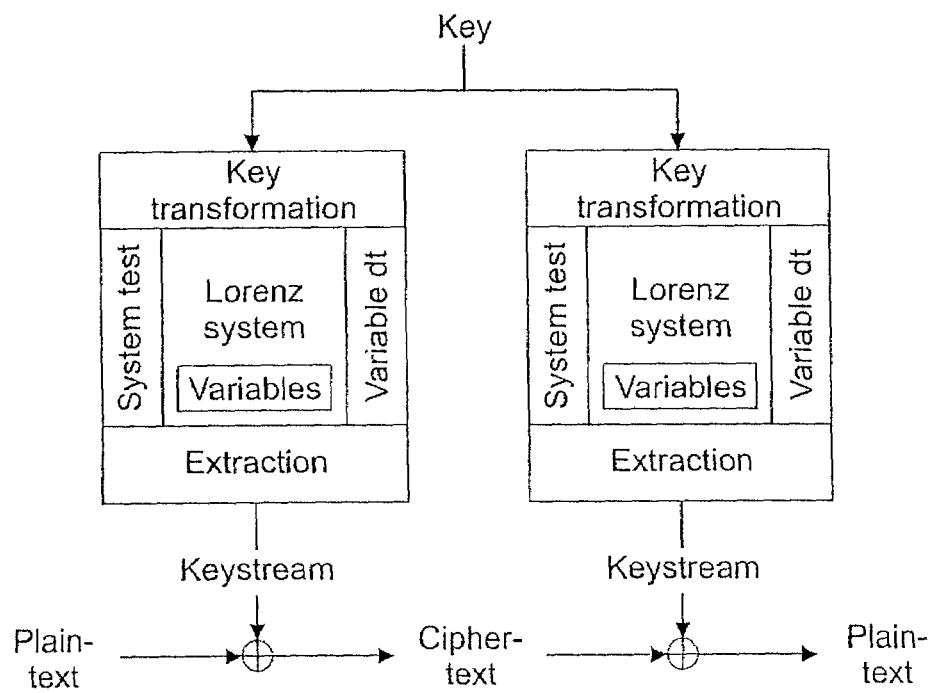
FIG. 4 is an illustration of the key elements in an encryption/decryption algorithm relying on various aspects of the invention.

The algorithm relies on a Pseudo-Random Sequence Stream Cipher system (PRSSC). PSSRC systems are characterized by a pseudo-random number generator (the content of the outer boxes on FIG. 4), which generates a sequence of data, which is pseudo-random, based on a binary key. This sequence, the so-called keystream, cf. FIG. 4, is used for the encryption and decryption. The keystream is unique for each possible key.

Applying the logical XOR-function (stated in the figure by the ⊕-symbol) on the plaintext and an equal amount of keystream encrypts the plaintext. The output of the XOR-function is the ciphertext. Applying the same approach once more on the ciphertext decrypts it into plaintext. The decryption will only reveal the encrypted plaintext if the key used for the decryption is fully identical to the key used for the encryption.

The integrity of the encrypted data is lying in the key capable of decrypting the ciphertext. Therefore it must be difficult to guess the key. To ensure this, the basic design of the algorithm is using a key of at least 128 bit. A key-size of 128 bit gives approximately $3.4 \cdot 10^{38}$ different keys.

The algorithm uses a system, which exhibits chaotic behaviour, such as a Lorenz system, which consists of the following three ordinary differential equations:

$$\frac{dx}{dt} = \sigma(y - x)$$
$$\frac{dy}{dt} = rx - y - xz$$
$$\frac{dz}{dt} = xy - bz$$

where σ, r, b are parameters, and x, y, z are state variables.

Figure 5:
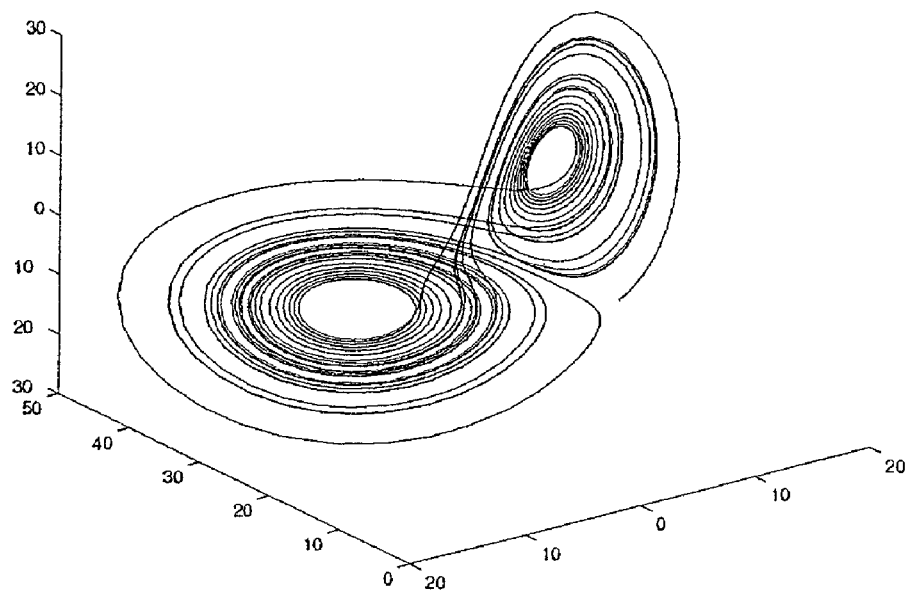
FIG. 5 is a plot of a numerical solution to a Lorenz system.

FIG. 5 shows a plot of a numerical solution to a Lorenz system.

The following parameter criteria should be satisfied for chaos to occur in the system:

$$(\sigma - b - 1) > 0, r > 1, r > \sigma \frac{(\sigma + b + 3)}{(\sigma - b - 1)}, \sigma, r, b > 0$$

Even then, not all solutions will be chaotic. In the parameter space, there will be so called periodic windows, referring to combinations of parameters, which give rise to periodic solutions. Before implementing the system, analysis of the parameter-space will be performed using calculation of a Lyapunov exponent. Generally, a positive Lyapunov exponent indicates that the solution to the mathematical system is chaotic, cf. Edward Ott, Chaos in Dynamical Systems, Cambridge University Press 1993.

The parameters are typically determined from a seed value, such as an encryption key or a part of an encryption key. Preferably, algorithms embodying the method of the present invention are designed so that only parameter values within predefined intervals are made possible, whereby it is ensured that the probability of the system having a positive Lyapunov exponent is high. Accordingly, the mathematical system will have a high probability of exhibiting chaotic behavior. The Lyapunov exponent may additionally or alternatively be determined at the beginning or during the mathematical computations, so as to be able to detect non-chaotic behavior of the solution to the mathematical system.

The mathematical system could as well be another continuous system (such as the Rossler system) or a discrete map (such as the Hénon map).

The integration is performed using a numerical integration routine. Provided an initial condition and an integration step length, the numerical integration routine calculates the solution at discrete mesh points, e.g. by using the Euler method or a Runge-Kutta method. Using the Euler method to express the Lorenz equations in discrete terms, the solution can be computed from the following equations $$x_{n+1} = x_n + (\sigma(y_n - x_n)) \cdot \Delta t_x$$

$$y_{n+1} = y_n + (x_n(r - z_n) - y_n) \cdot \Delta t_y$$

$$z_{n+1} = z_n + (x_n y_n - b z_n) \cdot \Delta t_z$$

The calculations are performed using fixed-point numbers which are described below.

During numerical integration of a system of differential equations, the continuous non-dependent variables (such as time t or space s) are discretized. This process refers to replacing the continuous interval [a;b] with a set of discrete points. In such a system, $\Delta T = (\Delta t_x, \Delta t_y, \Delta t_z)$ is usually referred to as the step length of the integration or the integration step.

Figure 7:
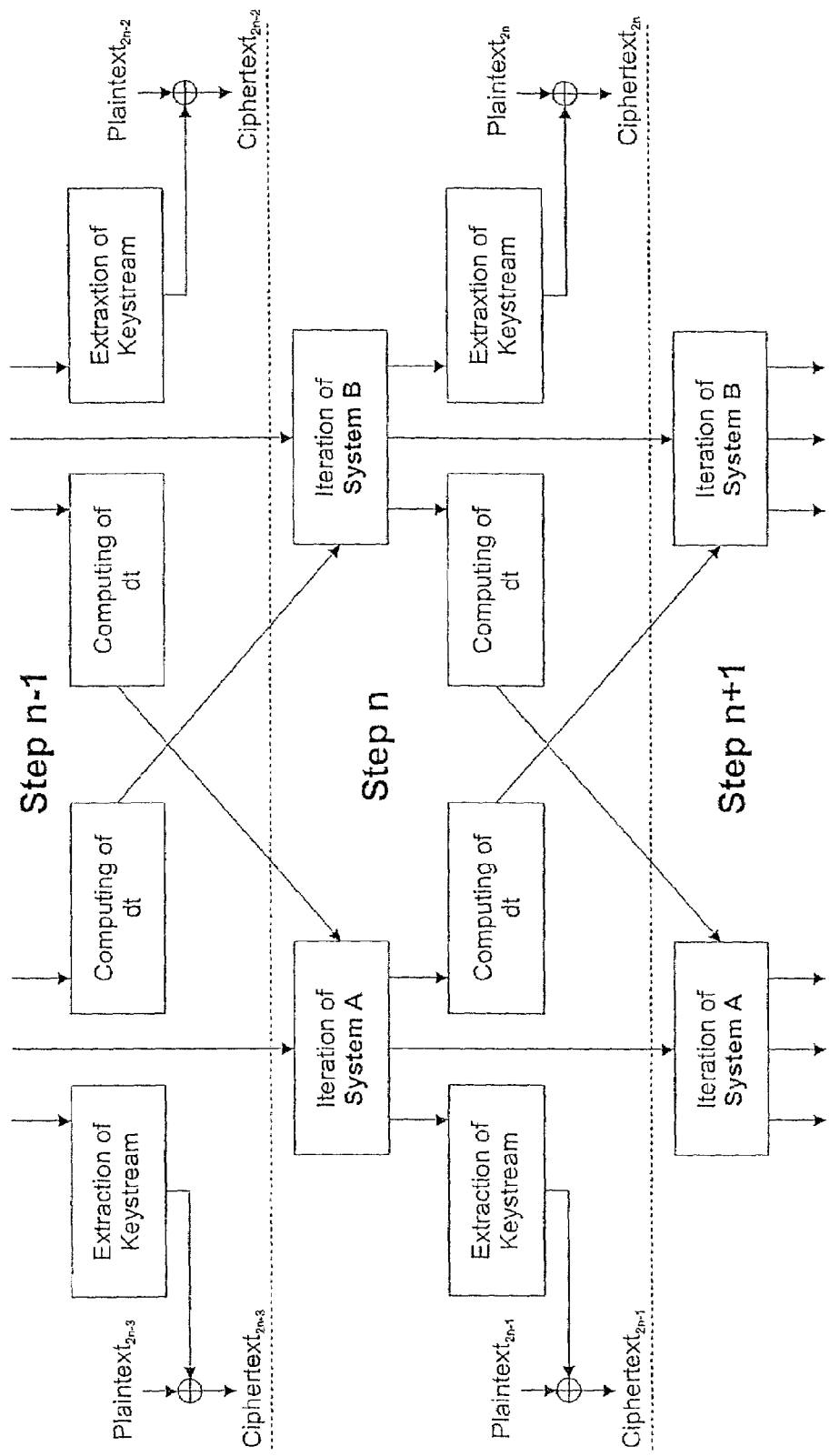
FIG. 7 illustrates a possible method of simultaneously computing two or more instances of identical or different chaotic systems.

FIG. 7 illustrates a possible method of simultaneously computing two or more instances of the same system or different systems, such as chaotic systems. The method confers higher computational speed and improved security, and a larger key may be used. Preferably there should be some kind of communication or coupling between the two systems, like for example exchange of step length, such as exchange of $\Delta t_x$, $\Delta t_y$, and/or $\Delta t_z$.

Figure 6:
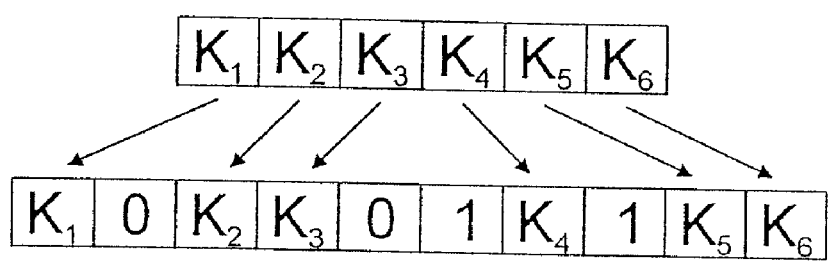
FIG. 6 is an illustration of key extension by padding.

The internal variables are in the basic design 32 bits wide each, but any variable width could be used. When using the Lorenz system, there are 6 internal variables (3 state variables and 3 parameters). Thus, 192 bits (in the basic design) are used to represent an internal state of the generator given by a set of the internal variables. The padding of the 128 bits key up to 192 bits should be done in such a way as to avoid illegal values, i.e. to ensure that all variables contain allowed values, and as to avoid that bits from the key are ignored. The padding may include inserting predetermined values of zeros and ones or repetitions of bits from the key. FIG. 6 contains an illustration of key extension by padding.

The integration may be performed with variable time steps, which e.g. can be calculated from any one of the state variables. In the basic design, the step length Δt varies in each integration step. This variation is coupled to the state variable X.

The keystream is extracted from some of the data related to the state variables. This may be done by extracting the 8 least significant bits from the y variable or by collecting some of the data wiped out in the calculations; e.g. from one or more of the multiplications performed in the calculation of one step.

Usually, calculations on a chaotic system are performed on computers using floating-point variables. However, this method introduces problems. One problem is that the use of floating-point variables may cause generation of different keystreams on different computers even if the same key is used, because of the slight differences in the implementation of floating-points on different computer systems.

Therefore fixed-point variables are used. The fixed-point variable is based on the integer data type; which is implemented identically on various computer systems. To express numbers, such as real numbers, digits after the decimal point are needed, the decimal point being artificially located somewhere else than at the end of the number (e.g. 12.345 instead of 12345).

To ensure proper operation of the algorithm, some tests should preferably be performed. Some of these tests are performed at run-time, and others are performed at design-time.

As a part of the initialization process, an amount of keystream equal to the complete data content of the state variables (e.g. 192 bits) or equal to the amount of a complete key (e.g. 128 bits) are generated using the algorithm and saved, in case the key has to be reloaded due to detection of periodic solutions or stationary points. In that case, the saved sequence is loaded as a new key, and the initialization, including extraction of extra key, is redone.

Do to the finite representation of numbers on a computer, any numerical solution will be periodic. However, some keys may result in keystreams having a rather small period. This is undesirable as it may compromise the security of the system. Therefore the present invention comprises an algorithm for detecting such periodic solutions. This algorithm watches the sign of a variable or the slope of a variable. When using the Lorenz system, the check is performed on x. When the sign changes from minus to plus (or plus to minus or just alters) the position check is performed (the position check can also be performed after all iterations). The position check compares the complete set of state variables with buffered sets from earlier. If a complete match is found, a periodic solution is detected.

Stationary points of a dynamical system are sets of state variables which remain unchanged during iteration. Such stationary points may be detected by comparing the current set of state variables with the last set, or by checking if the slopes of all of the variables are zero or by checking if both the current slope of one variable and its previous slope are zero.

Chaotic systems may, for one reason or another, enter into periodic solutions. This has to be detected and corrected in order not to compromise the security of the system. If the solution of the system becomes periodic, encryption may preferably be stopped, as the extracted number from the solution of the mathematical system will also be periodic and hence not pseudo-random. The test for periodic solutions includes comparing coordinates of the solution with previously calculated coordinates. If a complete match is found, the system has entered a periodic solution.

Figure 8:
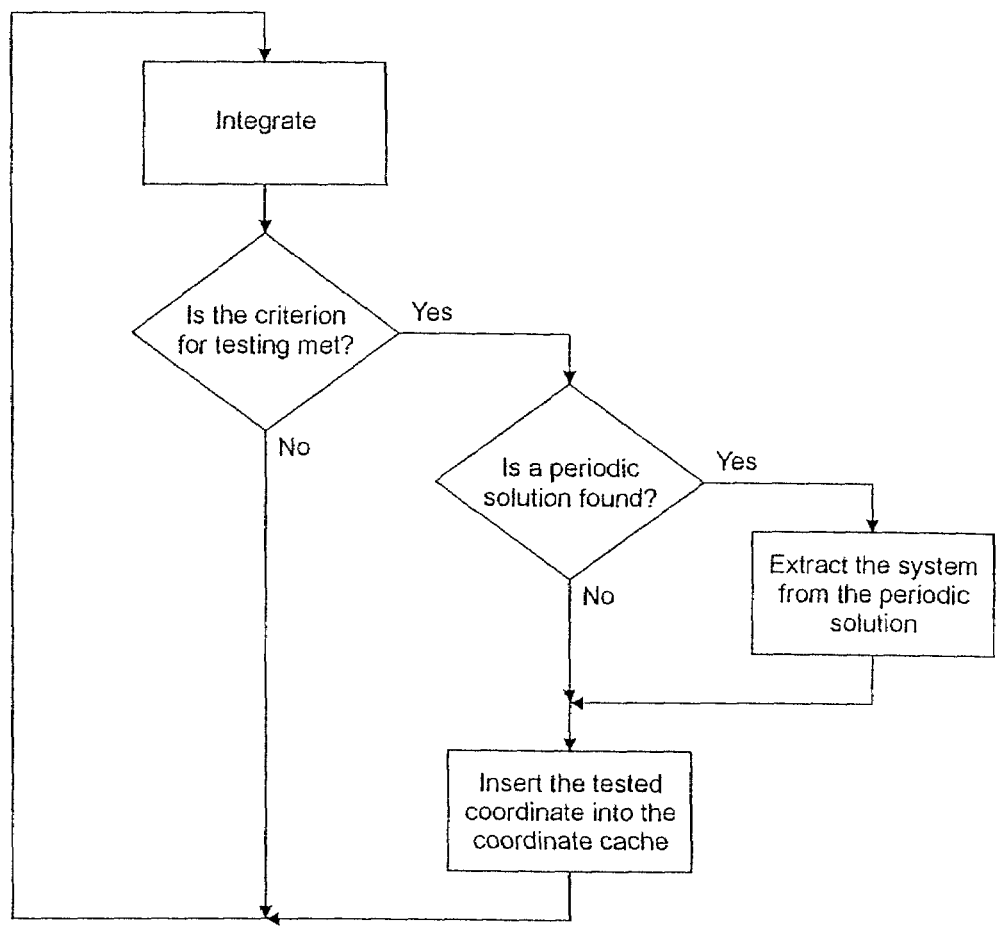
FIG. 8 illustrates the principle of performing a check for periodic solutions.

To reduce the amount of memory required to store previously calculated coordinates, and to reduce the processing time required to test the coordinates, only selected coordinates are stored in the coordinate cache. To reduce the processor time required to test for periodic solutions, the test is only performed when the coordinates meet certain criteria. FIG. 8 illustrates the principle of performing a check for periodic solutions.

Figure 9:
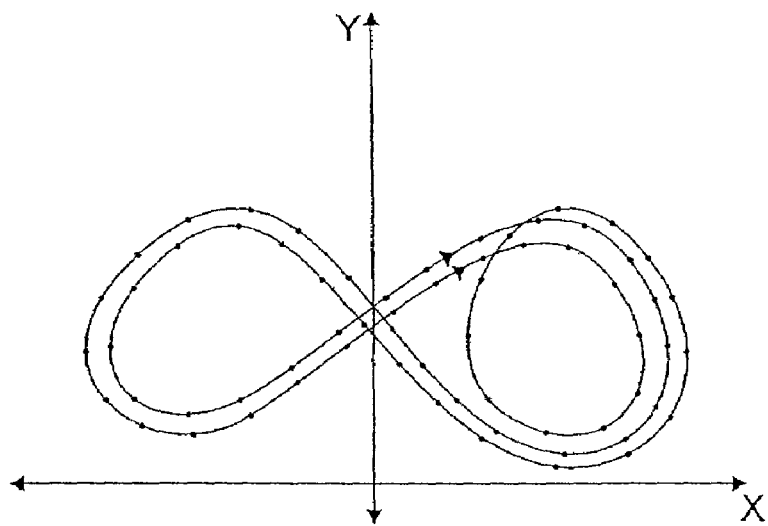
FIG. 9 shows a mathematical system with a period solution.

FIG. 9 shows a mathematical system with a period solution, more specifically a two-dimensional non-linear system with a periodic solution. The system is deterministic meaning that the solution is completely specified by its initial conditions. In theory, the solution will be continuous, thereby consisting of infinite many points. When solving the system numerically, the time-interval is discretized, and the solution is calculated at these points. The numerical solution to a mathematical system is simply a sequence of coordinate sets. If we consider a two-dimensional system, then the solution is specified at a number of points (x,y), illustrated by dots on the curve in FIG. 9. The deterministic nature of the system implies that if the solution ever hits a point, which it has visited previously, the solution is periodic and will keep being periodic. This property is employed in the present test.

In order to test for periodic solutions during numerical integration, we have to compare the present calculated coordinate set with the previous values. In order to do this, the coordinate sets are stored as they are calculated. This storage works like a queue and is referred to as the coordinate cache. A calculated coordinate set is compared to every coordinate set in the coordinate cache. If a complete match (all values in the two coordinate sets are equal) is found, the system is in a periodic state. If the test is passed without a complete match, no periodic behavior is detected, and the calculations may continue. Before the calculations continue, the tested coordinate is added to the cache, for further comparisons.

Figure 10:
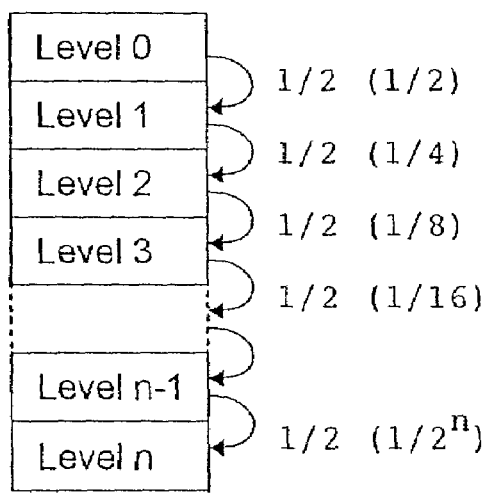
FIG. 10 illustrates transport between levels in the coordinate cache which stores previously calculated coordinates.

It will require too much memory and processor time to keep all calculated coordinate sets of the system in the cache. Hence, only selected coordinates are stored, as illustrated in FIG. 10.

The cache consists of a number of levels, each containing a coordinate of age growing by level. After each test or after a number of tests, the tested coordinate is inserted at level 0. Every second time (or any other time) a coordinate is inserted into level 0, the old value is inserted into level 1 before it is overwritten. The method for inserting coordinates at the other levels is similar; every second time a value is inserted at any level, the old value is transported to the next level before it is overwritten at the current level.

This method results in a coordinate cache containing coordinates with an exponentially growing age. Level 0 stores coordinates with an age of 1 or 2 (the prior checked coordinate or the one before the prior checked coordinate), level 1 stores coordinates with an age of 3–6 (3 at the test after the coordinate has been inserted, and then growing to 6 before the next coordinate is inserted), level 2 stores coordinates with an age of 7–14, and so on.

The pseudo program code in Example I shows how the cache may be implemented.

Because the age of the levels is varying, a periodic solution may not be found immediately. A periodic solution having a period length of 11 tests will be detected at level 2 of the cache, because the age of the data at level 2 is between 7 and 14. However, the test will not detect the periodic solution before the coordinate is exactly 11 tests old. Therefore up to 12 tests may be performed before the periodic behavior is detected. In this case, it means that the system may pass through up to 12/11 period before it is detected.

A possible expansion to the algorithm described above is a varying TransportAge, cf. the pseudo code program in Example I. If some coordinates can be identified as more likely to take part of a periodic solution then others, the InsertCoordinate procedure, cf. the pseudo code program in Example I, may recognize them, and use a reduced value of TransportAge for those. This will favor the critical coordinates in the cache, and make the data in cache become younger if many critical coordinates are stored. The younger age of data in the cache makes a periodical solution detectable after less iteration within the periodic solution.

Figure 12:
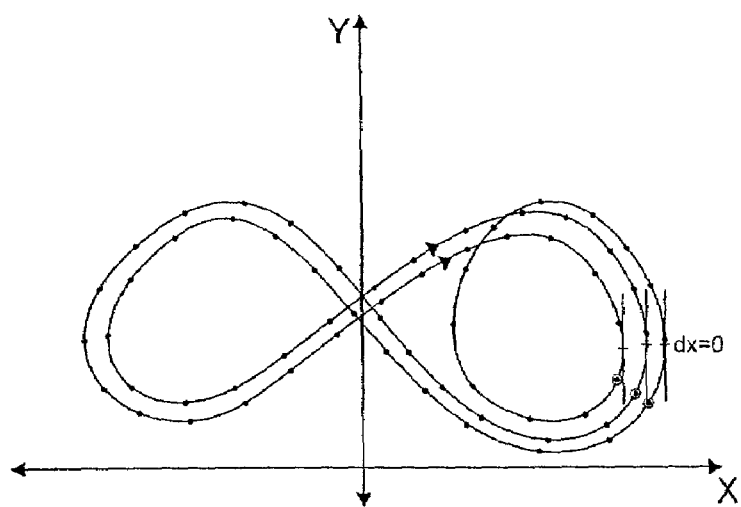
Figure 13:
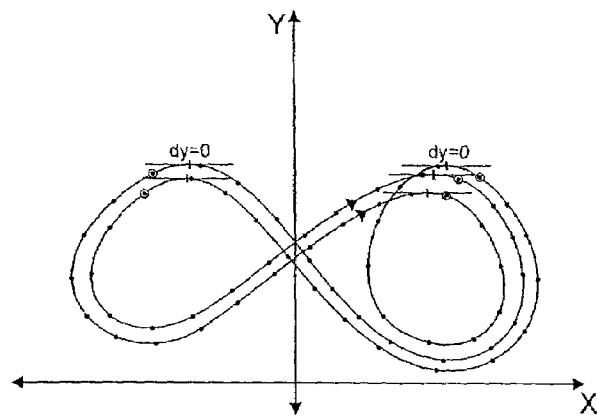

The test may be performed after each iteration. That means every time we have calculated a new coordinate set of the solution. However, to save processor resources, the test should instead be performed at a periodic interval. I order to make the test work; the test must be performed when the solutions is at a recognizable position. One way to make sure the test is performed at the same position each time is to find a recognizable point in the graphical plot of the solution. To do so, the system has to be analyzed for its characteristic behavior, and a criterion has to be chosen. For the above shown non-linear system, the examples of criteria illustrated in FIGS. 11–13 are useable.

Figure 11:
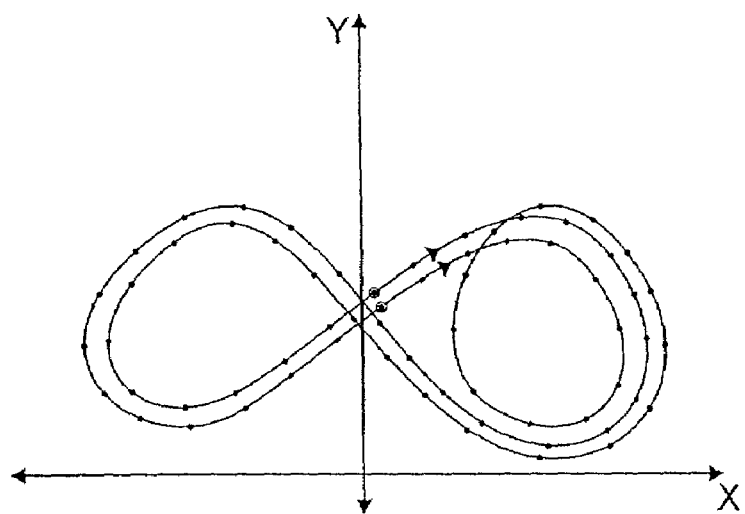
FIGS. 11–13 illustrate various criteria for the detection of periodic solutions, FIG. 14 contains an illustration of a method for multiplication of 16-bit numbers on an 8-bit processor.

First possible criterion, as illustrated in FIG. 11 is change of sign of x from minus to plus. That is, when the sign of x changes from minus to plus, the test is performed. The second criterion is change of sign of dx from plus to minus, as illustrated in FIG. 12. The third criterion is change of dy from plus to minus, as illustrated in FIG. 13.

When choosing the criterion, two considerations have to be made. First of all, all possible periodic solutions shall be able to fulfil the criterion. Secondly, to reduce processor load, the criterion with fewest tests should be selected.

At design time some extra tests can be performed on the systems and the chosen parameter spaces, to ensure the efficiency, stability and correctness of the system. These tests may include calculations of Lyapunov exponents, using Gram-Schmidt orthogonalization, as well as statistical analysis of the keystream.

EXAMPLE I

Figure 15:
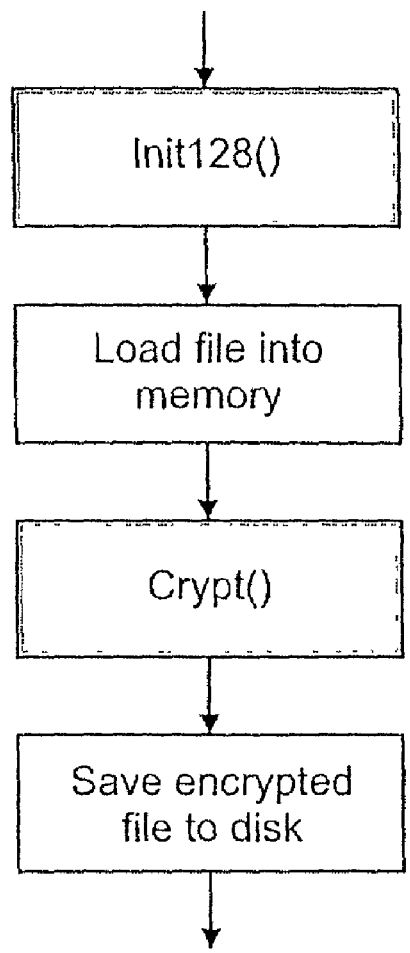
FIGS. 15–22 are flow charts showing the operation of one embodiment of an encryption method according to the present invention.
Figure 16:
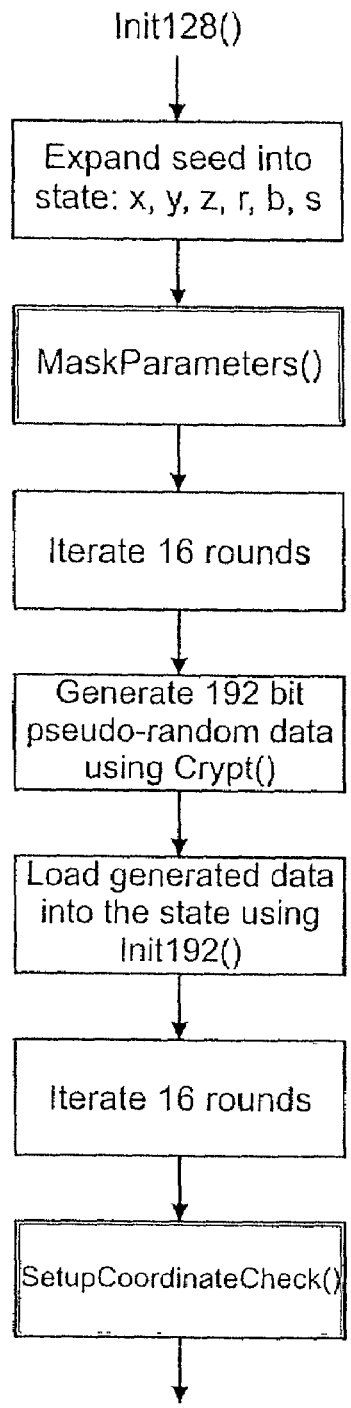
Figure 17:
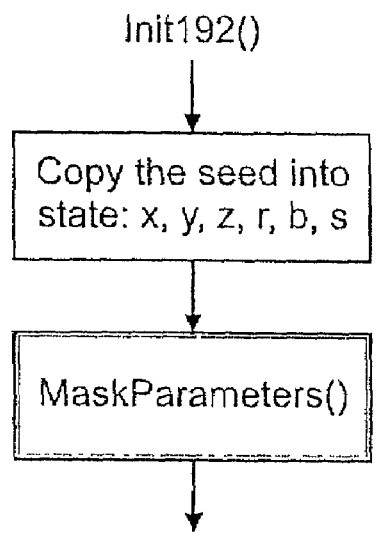
Figure 18:
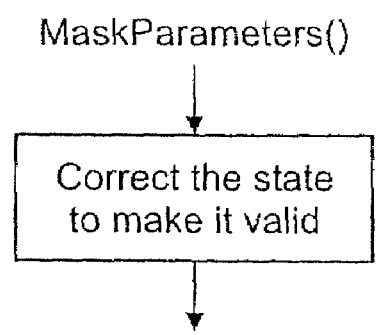
Figure 19:
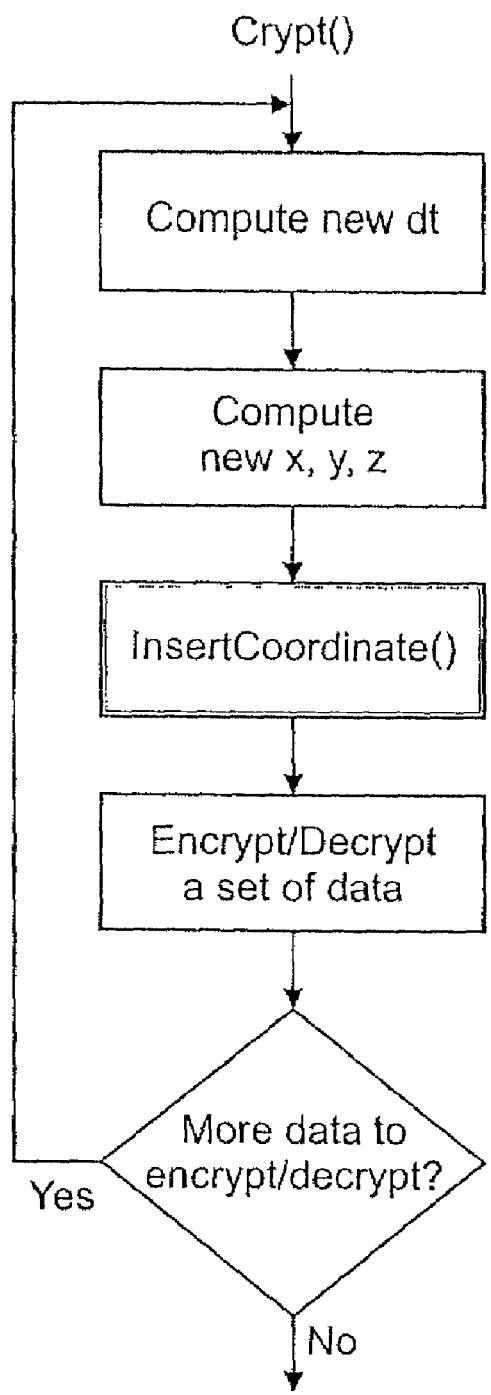
Figure 20:
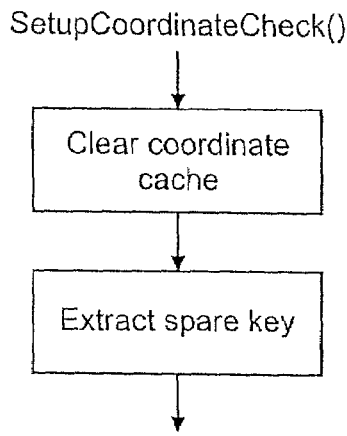
Figure 21:
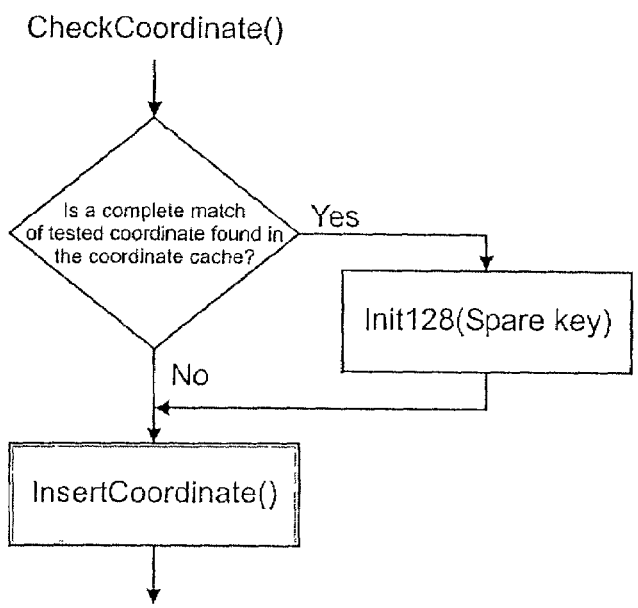
Figure 22:
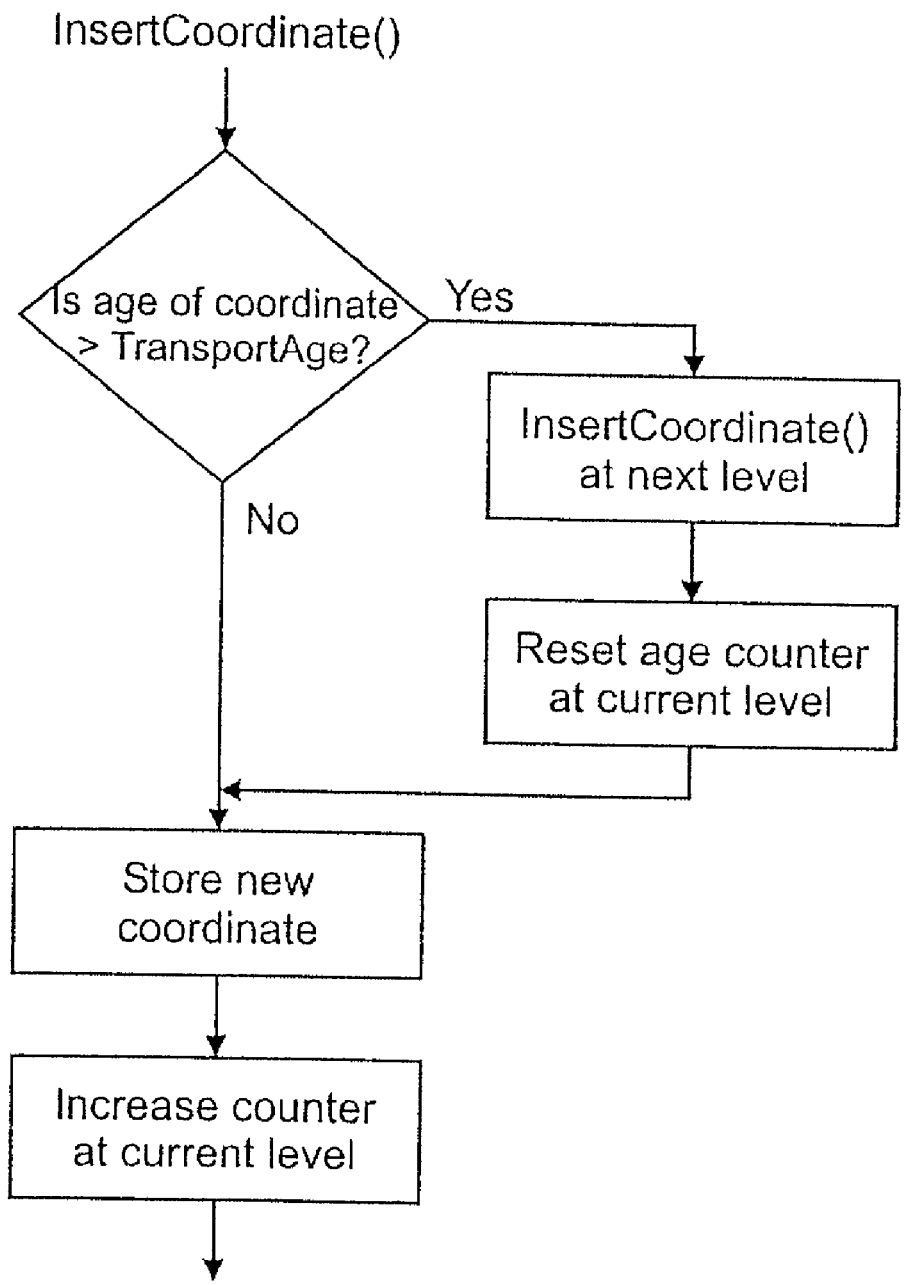

The following pseudo code program shows an example of a program for encrypting and decrypting data according to the invention which encrypts one byte at a time. The program works in accordance with the flow charts of FIGS. 15–22. The program works with 32-bit registers. FIG. 15 illustrates a method which encrypts a file containing data. FIGS. 16–22 correspond to those functions shown in the pseudo-code below which relate to check for periodic solution and to a stream-cipher using the Lorenz system.

Pseudo-code For Fixed-Point Library

FloatToFixedPoint: Converts a floating-point number, X, into a fixed-point number. The result of the function has the format S(a.b) or U(a.b)

```
fixedpoint FloatToFixedPoint (float X)
{
    return X*2^b;        // b is the number of bits after the decimal
                         // separator in the fixed-point
                         // representation of the result
}
```

FixedPointToFloat: Converts a fixed-point number, X, having the format S(a.b) or U(a.b), into a floating-point number.

```
float FixedPointToFloat (fixedpoint X)
{
    return X*2^-b;       // b is the number of bits after the decimal
                         // separator in the fixed-point
                         // representation of x
}
```

ConvertFixedPoint: Converts an input fixed-point number, X, having the format S(a.b) or U(a.b), into the requested format, S(c.d) or U(c.d). The result is signed if the argument, X, is signed, and vise versa.

```
fixedpoint ConvertFixedPoint (fixedpoint X)
{
    return X*2^{d-b};    // b is the number of bits after the decimal
                         // separator in the fixed-point
                         // representation of X. d is the number of
                         // bits after the decimal separator in the
                         // fixed-point representation of the result
}
```

Addition and subtraction of fixed-point numbers in the same format are performed using ordinary integer addition and subtraction functions.

MulFixedPoint: Multiply two fixed-point numbers, X and Y. X has the format S(a.b) or U(a.b) and Y has the format S(c.d) or U(c.d). The resulting fixed-point number, has the format S(e.f) or U(e.f). The result as well as X and Y must all be either signed or unsigned values and stored in 32-bit registers. ">>" is the arithmetic shift right for signed multiplication and logical shift right for unsigned multiplication.

```
fixedpoint MulFixedPoint(fixedpoint X, fixedpoint Y)
{
    fixedpoint64 Temp;   // A 64-bit register to hold the intermediate
                         // result
    Temp = X*Y;          // Two 32-bit values X and Y are multiplied
                         // into the 64-bit intermediate result
    return Temp >>       // b and d are the number of bits after the
    b+d-f;               // decimal separator in the fixed-point
                         // representation of X and Y respectively.
                         // f is the number of bits after the decimal
                         // separator in the fixed-point
                         // representation of the result.
                         // The conversion of the value of a 64-bit
                         // register into a 32-bit register is
                         // performed by ignoring the 32 most
                         // significant bits and copying
                         // the 32 least significant bit into the
                         // destination register.
}
```

Pseudo-code for check for periodic solution

Global constants in the sub-system for checking for periodic solutions. The code is able to detect periods when the number of inflexions is lesser than TransportAge$^{CaheDe}_{pth}$ (Note that there can only be half as many inflexions as iterations.)

```
const int CacheDepth = 32;
const int TransportAge = 2;
const int SpareSeedLength = 16;
```

The sub-system for checking for periodic solutions has a number of global variables e.g. to store the cache of old coordinates and the spare key to be loaded if a periodic solutions is found.

```
fixedpoint xCache [CacheDepth];
fixedpoint yCache [CacheDepth];
fixedpoint zCache [CacheDepth];
int CoordinateAge [CacheDepth];
char SpareSeed [SpareSeedLength];
fixedpoint xOld, xOldOld;
```

SetupCoordinateCheck: Set up the sub-system for checking for periodic solutions. All positions of the coordinate cache is reset to (x, y, z)=(0, 0, 0), since (0, 0, 0) is a stationary point for the Lorenz system, and therefore is a coordinate value indicating that a reload of the key is needed.

```
void SetupCoordinatecheck ( )
{
    int i;
                    // Clear coordinate cache
    for (i=0; i<CacheDepth; i++)
    {
      xCache[i] = 0;
      yCache[i] = 0;
      zCache[i] = 0;
      CoordinateAge[i] = 1;
    }
    xOld = 0;        // Variables for detecting when to check are
    xOldOld = 0;     // reset
                     // Prepare spare seed
    for (i=0; i<SpareSeedLength ;i++)
      SpareSeed[i] = 0;
                     // Generate the spare key
    Crypt(SpareSeed, SpareSeed+SpareSeedLength-1);
}
```

InsertCoordinate: Inserts a coordinate at a certain level of the coordinate cache if the age of the previous values stored at that level has passed a certain threshold value. Before the old coordinate at that certain level is overwritten, is it inserted at the next level.

```
void InsertCoordinate(fixedpoint x, fixedpoint y, fixedpoint z, int Level)
{
                    // Transfer current coordinate at this level
                    // ("Level") to next level ("Level"+1), if
                    // its age is equal to "TransportAge", unless
                    // this level is the highest level possible.
    if ((CoordinateAge[Level] >= TransportAge) &&
    (Level+1 < CacheDepth))
    {
      InsertCoordinate(xCache[Level], yCache[Level],
      zCache[Level], Level+1);
      CoordinateAge[Level] = 0;
```

-continued

```
    }
    xCache[Level] = x;    // Insert the new coordinate
    yCache[Level] = y;
    zCache[Level] = z;
                          // Increase the age counter for this level
    CoordinateAge[Level]++;
}
```

CheckCoordinate: Checks if the x variable solution curve has an inflexion, for which the sign of the slope of the curve changes from positive to negative. If not, the function exits. Otherwise the function checks if an equal coordinate is stored in the coordinate cache. If a match is found, the function loads the spare key into the algorithm. Finally, the coordinate is inserted into the coordinate cache.

```
void CheckCoordinate(fixedpoint x, fixedpoint y, fixedpoint z)
{
    int i;
                         // If inflexion, where the slope of
                         // x curve changes from positive to
                         // negative ...
    if ((x <= xOld) && (xOldOld <= xOld))
    {
                         // Check all stored coordinates ...
        for (i=0;i<CacheDepth;i++)
        {
                         // If match is found ...
          if ((xCache [i] == x) &&
          (yCache [i] == y) && (zCache [i] == z))
          {
                         // Period is found! - Load spare key
                         // and reinitialize
              Init128 (SpareSeed);
              break;
          }
        }
                         // Insert the coordinate into the
                         // coordinate cache
        InsertCoordinate(x, y, z, 0);
    }
                         // Store the x value for future comparison
    xOldOld = xOld;
    xOld = x;
}
```

Pseudo-Code For Stream-Cipher Using the Lorenz System

In this context, the modulus function, MOD, which takes an argument, q, returns a positive values in the range [0;q].

The σ-variable in the Lorenz equations has been renamed to "s".

The format of the fixed-point variables are defined according to Table I.

TABLE I

| Variable | Fixed-point format |
|---|---|
| r | S(7.24) |
| b | S(7.24) |
| s | S(7.24) |
| x | S(7.24) |
| y | S(7.24) |
| z | S(7.24) |

The format of the temporary fixed-point variables used in the Crypt function are defined according to Table II.

TABLE II

| Variable | Fixed-point format |
|---|---|
| tx | S(15.16) |
| ty | S(15.16) |
| tz | S(15.16) |
| dt | S(12.19) |

Allowed values for parameters, r, b, and s, and allowed starting conditions for coordinates, x, y, and z are listed in Table III:

TABLE III

| Variable | Allowed value |
|---|---|
| r | [1;5[ |
| b | [b+10;b+18[ |
| s | [4·b+0.5·s+12.5;4·b+0.5·s+20.5[ |
| $x_0$ | [−32;32[ |
| $y_0$ | [−32;32[ |
| $z_0$ | [−32;32[ |

Crypt: Encryption, decryption and PRNG function. Arguments are PData (pointer to the first byte to encrypt/decrypt) and PEnd (pointer to the last byte to encrypt/decrypt). If the function is intended to generate pseudo-random numbers, the function should be given an amount of data to encrypt (e.g. zeroes) of the same size as the requested pseudo-random data.

```
void Crypt(char* PData, char* PEnd)
{
    fixedpoint dt;
    while (PData <= PEnd)
    {
                                // Calculation of the time step
        dt = 10*2^-11 + x MOD 2^-11;
        tx = s*(y−x);           // Calculation of the next state
        ty = x*(r−z)−y;
        tz = x*y−b*z;
        x = x + tx*dt;
        y = y + ty*dt;
        z = z + tz*dt;
                                // Check and insert the coordinate
        InsertCoordinate(x, y, z, 0);
                                // Extract and encrypt
        *PData = *PData XOR ((y*2^24 XOR y*2^16) MOD 2^8);
        PData = PData + 1;      // Increase the pointer to data to encrypt
    }
}
```

MaskParameters: To ensure that the initial state and the parameters are valid after loading an expanded key or a pseudo-random sequence, the state and parameters has to be modified using this function. The correction is performed according to the restrictions defined in table III.

```
void MaskParameters( )
{
    x = x*0.25;
    y = y*0.25;
    z = z*0.25;
    b = (b MOD 4) + 1;
    s = (s MOD 8) + 10 + b;
    r = (r MOD 8) + 12.5 + 2*b + 0.5*s;
}
```

Initl92: Load a 192-bit seed (pointed to by the PSeed pointer) into the state of the system.

```
void Init192(char* PSeed)
{
    x = *PSeed;                 // Copy the seed into the state
    y = *(PSeed+4);
    z = *(PSeed+8);
    r = *(PSeed+12);
    b = *(PSeed+16);
    s = *(PSeed+20);
    MaskParameters( );          // Correct the state to make it valid
}
```

Initl28: Load a 128-bit seed (or key) (pointed to by the PSeed pointer) into the state of the system performing the key setup procedure.

```
void Init128(char* PSeed)
{
    char Seed192[24];   // Allocate 24 bytes of memory
    int i;
    x = *PSeed;         // The seed is expanded into the state
    y = *(PSeed+3);
    z = *(PSeed+6);
    r = *(PSeed+8);
    b = *(PSeed+10);
    s = *(PSeed+12);
    MaskParameters( );  // Make state valid
                        // Iterate 16 rounds before extraction
    Crypt(Seed192, Seed192+15);
    for (i=0;i<24;i++)  // Reset the data in Seed to zeroes
        Seed192[i] = 0;
                        // Generate 24 bytes of pseudo-random data
    Crypt(Seed192, Seed192+23);
    Init192(Seed192);   // Load the pseudo-random data into the state
                        // Iterate 16 rounds before using the
                        // algorithm
    Crypt(Seed192, Seed192+15);
                        // Initiate the coordinate check algorithm
    SetupCoordinateCheck( );
}
```

The statistical properties of the output of the system, i.e. the keystream, may be tested according to the NIST (National Institute of Standards and Technology) Test Suite, cf. 'A statistical test suite for random and pseudo-random number generators for cryptographic applications', NIST Special Publication 800-22. See also http://csrc.nist.gov/rng/rng2.html. The NIST Test Suite comprises sixteen different tests, which are briefly summarized below. The tests may for example be performed on a program similar to the above pseudo-code for a stream cipher using the Lorenz system.

The tests deliver a number of almost non-overlapping definitions of randomness. The simpler definitions are included below, whereas those definitions which require more complicated concepts from the theory of probability are referred to by the phrase "what can be calculated/is expected for a truly random sequence". The above NIST publications contain the appropriate definitions and references to works on the theory of probability.

Frequency monobit test: This test determines the proportion of zeroes and ones for the entire keystream sequence. For a truly random keystream sequence, the number of ones is expected to be about the same as the number of zeros. During the test, it is investigated whether this property holds for the keystream sequence in question.

Frequency block test: In this test, the keystream sequence is divided into M-bit blocks. In a truly random keystream sequence, the number of ones in each block is approximately M/2. If this also characterizes the tested keystream sequence, the test is regarded as successful.

Runs test: A run within the keystream sequence is defined as a sub-sequence of identical bits. The test checks for runs of different lengths, where a run of length k is constituted by k identical bits bounded by bits of a value opposite to the bits in the run. The occurrence of runs of different lengths is compared to what is expected for a truly random sequence.

Longest run of zeroes: In this test, the sequence is divided into blocks of M bits each, and the longest run of ones within each block is found. The distribution of the lengths of runs for the blocks is compared to the distribution for blocks in a random sequence. An irregularity in the expected length of the longest run of ones indicates that there is also an irregularity in the expected length of the longest run of zeroes.

Binary matrix rank test: In this test, fixed length sub-sequences of the keystream sequence are used to form a number of matrices by colllecting M-Q bit seggments into M by Q matrices. By calculating the rank of these matrices, the test checks for linear dependence among the sub-sequences.

Discrete Fourier transform test: By applying the discrete Fourier transform, this test checks for periodic characteristics of the keystream sequence. The height of the resulting frequency components are compared to a threshold defined from a truly random sequence.

Non-overlapping template matching test: When performing this test, a number of non-periodic m-bit patterns are defined, and the occurrences of the particular patterns are counted.

Overlapping template matching test: This test is very similar to the non-overlapping template matching test, the only differences being the structure of the pattern of m bits, and the way the search for the pattern is performed. The pattern of m bits is now a sequence of m ones.

Maurer's universal statistical test: This test calculates the distance between matching patterns in the keystream sequence. By doing so, a measure of the compressibility of the keystream sequence is obtained. A significantly compressible keystream sequence is considered to be non-random.

Lempel-Ziv compression test: In this test, the number of cumulatively distinct patterns is calculated, thus providing a measure of the compressibility of the keystream sequence. The result is compared to a random sequence, which has a characteristic number of distinct patterns.

Linear complexity test: This test calculates the length of a linear feedback shift register in order to determine whether or not the sequence is complex enough to be considered random.

Serial test: This test calculates the frequency of all possible overlapping m-bit patterns across the entire sequence. For a truly random keystream sequence, all of the $2^m$ possible m-bit patterns occur with the same probability. The deviation from this probability is calculated for the keystream sequence in question.

Approximate entropy test: This test has the same focus as the serial test, but with the added feature that the frequencies of m- and (m+1)-bit patterns are calculated. The results obtained for the patterns of different length are compared and used to characterize the sequence as either random or non-random.

Cumulative sums test: In this test, the sequence is used to define a random walk with ones and zeroes corresponding to +1 and −1, respectively. It is determined whether the amplitudes of the cumulative sums of the partial keystream sequences are too large or too small relative to what is expected for a truly random keystream sequence.

Random excursions test: In this test, the sequence is similarly to the cumulative sums test transferred into a random walk. The number of visits to certain states (values the cumulative sum can hold), which the random walk potentially passes through, is used to characterize the sequence as either random or non-random. The considered states are −4, −3,−2,−1, 1, 2, 3, 4.

Random excursions variant test: Almost identical to the random excursions test. Eighteen states are used in this test.

For each test, a P-value, $P_{val}$, is calculated, which provides a quantitative comparison of the actual sequence and an assumed truly random sequence. The definitions of the P-values depend on the actual test (see the NIST documentation). Values of $P_{val}>\alpha$ indicate randomness, where a is α value in the interval $0.001<\alpha<0.01$, the exact value of α being defined for each test. Otherwise, non-randomness is declared.

The NIST Test Suite defines, for each test, the proportion of samples, whose P-value should pass the criterion $P_{val}>\alpha$. In all of the above tests, except the Random excursions test, the proportion of samples whose respective P-values, $P_{val}$, pass the appropriate criteria should be at least 0.972766. For the Random excursions test, the proportion given by NIST is at least 0.967813.

In preferred embodiments of the present invention, the following proportions are preferably achieved, as an average of at least $10^4$ samples obtained by use of randomly chosen keys: at least 0.975, such as at least 0.98, such as at least 0.985, such as at least 0.99, such as at least 0.995, such as at least 0.998.

Possible input parameters to the NIST Test Suite are given in Table IV below in the notation used in the documentation accompanying the NIST Test Suite.

TABLE IV

| Name of test | Input |
| --- | --- |
| Frequency block test | m = 100 |
| Longest run test | M = 10000 |
| Non-overlapping templates matching test | m = 9 |
| Overlapping templates matching test | m = 9 |
| Maurer's universal test | L = 7, Q = 1280 |
| Serial test | m = 5 |
| Approximate entropy test | m = 5 |

EXAMPLE II

Table V shows the speed of encryption of a method according to the present invention as well as speeds of encryption of various known encryption methods. The speed of the encryption method of the present invention was achieved in a prototype incorporating the features of the encryption/decryption program according to the invention. The key size was a 256 bit key, and the encryption/decryption speed was measured on a 400 MHz Pentium II processor by counting number of clock cycles spend on execution of the encryption/decryption algorithm. The prototype of the algorithm was implemented in assembly language using MMX™ instructions on a system involving two instances, as exemplified in FIG. 7. The prototype solved two Lorenz systems exhibiting chaotic behavior and extracted a total of 64 bit in each integration step, i.e. in each combined integration step of the two instances. The prototype differed from the algorithm of the pseudo code program described in Example I with reference to FIGS. 15–22 mainly in that:

The prototype utilized the MMX™ technology by solving two systems in parallel.

The prototype extracted a total of 64 bit in each integration step.

The prototype did not test for periodic solutions.

From the measurements, the speed was calculated to be equivalent to an encryption/decryption speed of 1010 Mbit/sec on a 450 MHz Pentium II processor.

TABLE V

| Name | Year of introduction | Type | Key size [bit] | Block size [bit] | Speed [clocks/byte] | Speed [Mbit/s] | Memory Requirements for tables etc. [bytes] |
|---|---|---|---|---|---|---|---|
| AES/Rijndael | 1998 | block | 128–256 | 128–256 | $14.8^3$ | 232 | >256–4096 |
| Blowfish | 1994 | block | 32–448 | 64 | $18^2$ | 191 | <5 K |
| Present Invention | | stream | 128–256 | — | 3.4 | 1010 | 40–72 |
| DES | 1975 | block | 56 | 64 | $45^2$ | 76 | >256 |
| IDEA | 1992 | block | 128 | 64 | $50^2$ | 69 | >12 |
| Panama | 1998 | stream | 256 | — | $6.7^1$ | 512 | >1092 |
| RC4 | 1987 | stream | 32–2048 | — | $7^2$ | 490 | >256 |
| SNOW | 2000 | stream | 128–256 | — | $8.1^4$ | 424 | 1024 |
| SOBER-t32 | 2000 | stream | 128 | — | $7.3^4$ | 470 | ? |

Speed is estimated from different sources. The superscripts in the "Speed [clocks/byte]" column of Table V refers to the below source references:
1. Crypto++4.0 Benchmarks, www.eskimo.com/~weidai/benchmarks.html, MS C++ (Intel Celeron 850MHz), available on 7 Dec. 2001.
2. Bruce Schneier et al.: Fast Software Encryption: Designing Encryption Algorithms for Optimal Software Speed on the Intel Pentium Processor.
3. Kazumaro Aoki et al.: Fast Implementation of AES Candidates (128 bit keys, 128 bit blocks, Pentium II).
4. Performance Evaluation of NESSIE First Phase (draft version 3.0), http://www.cosic.esat.kuleuven.ac.be/nessie/ available on 7 Dec. 2001.

In general, speed and memory can be traded for many of the implementations, e.g. by using lookup tables which require more memory but may save processing time.

END OF EXAMPLE II

When performing computations on numbers expressed as binary numbers, for example when adding or multiplying two numbers, it may be possible to omit parts of the computations involved in addition or multiplication, if bits of a number resulting from the addition or multiplication may be omitted or disregarded. Thus, if the least significant bits of the resulting number are not necessary or if the most significant bits of the resulting number may be disregarded (which may be the case in a pseudo-random number generator, where what is needed is not the true result of the computations but merely a pseudo-random number), the least and/or most significant bits of the resulting number need not be computed.

Thus, in a further aspect, the present invention relates to a method for performing mathematical operations on integer numbers of a certain bit width which is larger than the register width of the processing unit on which the computations are performed. Mathematical operations or computations on fixed-point numbers are performed as integer operations, whereby the integer numbers are expressed as binary numbers. The binary representation of integer numbers requires a certain register width, e.g. 32 bit. When performing mathematical operations, such as addition or multiplication, by means of a processing unit having a register width which is smaller than the width required for representation of the binary numbers, e.g. 8 bit, the binary numbers may be split into a plurality of binary sub-numbers, each represented by a width equal to or smaller than the register width of the processing unit. Thus, two 32 bit numbers may be split into two sets of four 8 bit sub-numbers, and multiplication or addition may be performed on the 8 bit sub-numbers by means of an 8 bit processing unit. For example, addition of a number
A=11011001101101010110101010110111 and a number
B=10000111011110111111010101001001 to achieve a result R=A+B may be performed by performing the following steps:
1. Each of the numbers A and B is split into four sub-numbers, A1, A2, A3, A4, and B1, B2, B3, and B4. A1 represents the 8 most significant bits of the number A, and A4 represents the 8 least significant bits of the number A, etc. Thus, in the example shown above, the sub-numbers are:
   A1=11011001
   A2=10110101
   A3=01101010
   A4=10110111
   B1=10000111
   B2=01111011
   B3=11110101
   B4=01001001
2. The least significant sub-numbers, A4 and B4 are then added: R4=A4+B4. Any carry resulting from the addition of A4 and B4, C4, is stored.
3. The second least significant sub-numbers, A3 and B3, and the carry from step 2 above, C4, are then added: R3=A3+B3+C4. Any carry resulting from this addition, C3, is stored.
4. Addition of A2 and B2 in a way analogous to step 3, to achieve R2 and C2.
5. Addition of A1 and B1 in a way analogous to steps 3 and 4 to achieve R1. Any carry resulting from this addition, C1, is regarded as overflow and is not taken into consideration.
6. The number resulting from the addition of A and B is stored as four sub-numbers, R1, R2, R3 and R4, and/or represented by a 32 bit wide string built from the sub-numbers R1, R2, R3, and R4.

Figure 14:
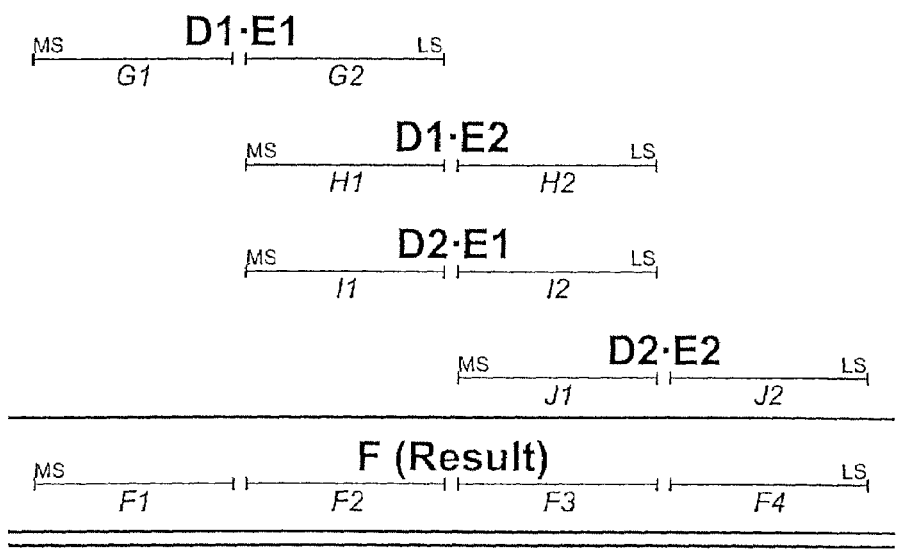

In case not all bits in a number resulting from a multiplication operation are to be used in further computations, and/or in case not all bits are significant for the further computations and may be disregarded, processing time in connection with multiplication operations on a processing unit having a register width smaller than the bit width of the numbers to be multiplied may be reduced by performing only partial multiplication as explained below. For example, multiplication of two 16 bit numbers, D and E, wherein
D=1101100110110101 and
E=0110101010110111 on an 8 bit processing unit to achieve a 32 bit number, F, may be performed by the following steps:
1. Each of the numbers D and E are split into two sub-numbers, D1, D2, and E1, E2. D1 represents the 8 most significant bits of D, D2 represents the 8 least significant bits of D, etc. Thus, in the example shown above, the sub-numbers are:
   D1=11011001
   D2=10110101
   E1=01101010
   E2=10110111
2. D1 is multiplied with E1 to achieve a 16 bit number expressed as two 8 bit numbers, G1 and G2.
3. D1 is multiplied with E2 to achieve a 16 bit number expressed as two 8 bit numbers, H1 and H2.
4. D2 is multiplied with E1 to achieve a 16 bit number expressed as two 8 bit numbers, I1 and I2.
5. D2 is multiplied with E2 to achieve a 16 bit number expressed as two 8 bit numbers, J1 and J2.
6. The resulting 32 bit number F is expressed as four 8 bit numbers, F1, F2, F3, and F4, wherein:
   F4=J2
   F3=H2+I2+J1
   F2=G2+H1+I1+[any carry resulting from the calculation of F3]
   F1=G1+[any carry resulting from the calculation of F2], as illustrated in FIG. 14 wherein MS denotes "most significant 8 bit" and LS denotes "least significant 8 bit".

Processing time may be saved by disregarding F4, i.e. the least significant bits of the number resulting from the multiplication, and by disregarding J1 in the addition which leads to F3. Thus, the multiplication of D2 with E2 at step 5 may be omitted, whereby less mathematical operations are performed, which leads to saving of processing time. This omission has an impact on the computational result which, however, may be acceptable if the omission is performed consistently throughout the computations in, e.g. a pseudo-random number generator, e.g. in an encryption/decryption algorithm, and if it is performed both in decryption and encryption. It should usually be ensured that properties of the mathematical system, e.g. chaotic behavior, which are of importance in the context in question, e.g. encryption/decryption, are maintained in spite of the impact which the omission of one or more computational steps has on the computations.

In a further aspect, the invention relates to a method of performing multiplication operations on a first binary number and a second binary number. The method comprises summing a number of intermediate results, whereby the sum of the intermediate results is equal to the product of the two numbers. Each intermediate result is achieved as the product of one single bit (1 or 0) of the first number and the entire second number, $\alpha$, whereby the product and thus the intermediate number may be determined by a simple "if . . . then" algorithm and/or a logical AND operation, as the product of $1 \cdot \alpha = \alpha$, and as the product of $0 \cdot \alpha = 0$.

Subsequent to computing the intermediate number, the intermediate number is shifted a number of positions to the left, the number of positions corresponding to the position of the bit of the first number from which that particular intermediate number is calculated. Alternatively, either the second number or the particular bit of the first number is switched to the left. Accordingly, the step of multiplying one bit of a first one of the two numbers is repeated for each bit of the first number. For example the product of a first number, 0110, and a second number 1010 is computed as follows: the least significant bit of the first number, 0, is multiplied with the second number 1010 to obtain a first intermediate number, 0000. Then, the second least significant bit of the first number, 1, is multiplied with the second number and shifted one position to the left to obtain a second intermediate number, 10100. Then, the third least significant bit of the first number, 1, is multiplied with the second number and shifted two positions to the left to obtain a third intermediate number, 101000. Finally, the most significant bit of the first number, 0, is multiplied with the second number and shifted three positions to the left to obtain a fourth intermediate number, 0000000. The resulting number is obtained as a sum of the four intermediate numbers, as illustrated below, the underlinings indicating which bits are being multiplied in the individual steps:

| | |
|---|---|
| 011<u>0</u> · <u>1010</u> → | 0000 (first intermediate number) |
| 01<u>1</u>0 · <u>1010</u> → | 10100 (second intermediate number) |
| 0<u>1</u>10 · <u>1010</u> → | 101000 (third intermediate number) |
| <u>0</u>110 · <u>1010</u> → | 0000000 (fourth intermediate number) |
| Result: | 0111100 (sum of intermediate numbers) |

The invention claimed is:

1. A method of performing numerical computations in a cryptographic system, which includes a mathematical system comprising at least one function, the method comprising the steps of:
   expressing the mathematical system in discrete terms,
   expressing at least one variable of the mathematical system as an integer number,
   placing an imaginary decimal separator in said integer number, whereby the integer number represents a real number,
   performing computations including the at least one variable expressed as an integer number so as to obtain a resulting number, the resulting number being expressed as an integer number,
   positioning the imaginary decimal separator in the resulting number at a predetermined position by performing at least one of the steps of:
      correcting the position of the imaginary decimal separator in the integer number, and
      placing an imaginary separator in the resulting number,
   the method further comprising the step of using the resulting number to obtain an output of the cryptographic system.

2. The method of claim 1, wherein the integer number is a fixed-point number,
   performing said computations in such a way that the computations include the at least one variable expressed as a fixed-point number,
   obtaining, from said computations, the resulting number, the resulting number representing at least one of:

a. at least a part of a solution to the mathematical system, and
b. a number usable in further computations involved in the numerical solution of the mathematical system, the method further comprising:
extracting a set of data which represents at least one of:
i. a subset of digits of the resulting number, and
ii. a subset of digits of a number derived from the resulting number.

3. A method according to claim 2, wherein said set of data represent a pseudo-random number.

4. A method according to claim 2, wherein said computations include at least a first and a second fixed-point number, each fixed-point number having a decimal separator, wherein the decimal separator of the first fixed-point number is positioned at a position different from the position of the decimal separator of the second fixed-point number.

5. A method according to claim 4, wherein the step of performing computations includes positioning the decimal separator of the first and second fixed-point number at selected positions.

6. A method according to claim 2, wherein said at least one function is non-linear.

7. A method according to claim 2, wherein the resulting number is expressed as a variable selected from the group consisting of:
an integer number,
a floating point number, and
a fixed-point number.

8. A method according to claim 2, wherein the mathematical system comprises at least one of:
a differential equation,
a discrete mapping.

9. A method according to claim 8, wherein the differential equation comprises at least one of:
a partial differential equation,
an ordinary differential equation.

10. A method according to claim 8, wherein the discrete mapping comprises at least one of:
an area-preserving map,
a non area-preserving map.

11. A method according to claim 8, wherein the mathematical system comprises at least one non-linear function governing at least one state variable X.

12. A method according to claim 11, wherein the mathematical system comprises a set of non-linear mapping functions.

13. A method according to claim 10, wherein the map comprises at least one of:
a logistic map of the form:

$$x_{n+1} = \mu x_n (1-x_n),$$

an Anosov map of the form:

$$\begin{bmatrix} x_{n+1} \\ y_{n+1} \end{bmatrix} = \begin{bmatrix} 1 & 1 \\ 1 & 2 \end{bmatrix} \begin{bmatrix} x_n \\ y_n \end{bmatrix} \mod 1,$$

a Hénon map of the form:

$$\begin{bmatrix} x_{n+1} \\ y_{n+1} \end{bmatrix} = \begin{bmatrix} 1 + y_n - ax_n^2 \\ bx_n \end{bmatrix}.$$

14. A method according to claim 2, wherein the mathematical system comprises at least one non-linear differential equation.

15. A method according to claim 14, wherein the mathematical system comprises a set of non-linear differential equations.

16. A method according to claim 8, wherein the mathematical system has at least one positive Lyapunov exponent.

17. A method according to claim 8, comprising computing at least one Lyapunov exponent at least once during the mathematical computations.

18. A method according to claim 14, wherein the at least non-linear differential equation governs at least one state variable, X, which is a function of at least one independent variable, t.

19. A method according to claim 15, wherein the set of non-linear differential equations is a Lorenz system.

20. A method according to claim 19, wherein the Lorenz system consists of the following differential equations:

$$\frac{dx}{dt} = \sigma(y-x),$$

$$\frac{dy}{dt} = rx - y - xz,$$

$$\frac{dz}{dt} = xy - bz,$$

wherein X=(x, y, z) are state variables, t is the independent variable, and σ, r and b are parameters.

21. A method according to claim 14, wherein the step of performing computations comprises numerically integrating at least one of:
the non-linear differential equation, and
the non-linear differential equations of said set of non-linear differential equations, by repeatedly computing a solution $X_{n+1}$ based on at least one previous solution $X_m$, m≦n+1, and a step length, ΔTn, of the independent variable, t.

22. A method according to claim 21, wherein the step of integrating comprises providing at least one initial condition, $X_0$, of the state variable, X, and an initial step length, $\Delta T_0$.

23. A method according to claim 11, wherein the step of performing computations comprises numerically iterating the non-linear mapping function.

24. A method according to claim 23, wherein the step of iterating comprises providing at least one initial condition, $X_0$, of the state variable, X.

25. A method according to claim 21, wherein, in the discretized formulation of the Lorenz system, the solution $X_{n+1}$ is computed using the step length $\Delta T = (\Delta t_{x,n}, \Delta t_{y,n}, \Delta t_{z,n})$ as follows:

$$x_{n+1} = x_n + (\sigma(y_n - x_n)) \cdot \Delta t_{x,n}$$

$$y_{n+1} = y_n + (x_n(r-z_n) - y_n) \cdot \Delta t_{y,n}$$

$$z_{n+1} = z_n + (x_n y_n - bz_n) \cdot \Delta t_{z,n},$$

wherein:
$\Delta t_{x,n}$ is the step length used in the computation of $x_{n+1}$,
$\Delta t_{y,n}$ is the step length used in the computation of $y_{n+1}$,
$\Delta t_{z,n}$ is the step length used in the computation of $z_{n+1}$.

26. A method according to claim 21, wherein the step length ΔT is constant throughout the computations.

27. A method according to claim 21, wherein, in each integration step, at least one of the elements ($\Delta t_{x,n}$, $\Delta t_{y,n}$, $\Delta t_{z,n}$) of the step length $\Delta T$ is a function of at least one number related to said computations.

28. A method according to claim 27, wherein, in each integration step, at least one of the elements ($\Delta t_{x,n}$, $\Delta t_{y,n}$, $\Delta t_{z,n}$) of the step length $\Delta T$ is a function of at least one solution, $X_m$, which is a solution to the mathematical system.

29. A method according to claim 27, wherein, in each integration step, at least one of the elements ($\Delta t_{x,n}$, $\Delta t_{y,n}$, $\Delta t_{z,n}$) of the step length $\Delta T$ is a function of at least one given step length, $\Delta T_m$.

30. A method according to claim 2, wherein a key selected from an encryption key and a decryption key is used to determine at least one value of at least one variable in the mathematical system.

31. A method according to claim 30, wherein the key is used to determine at least a part of the initial condition $X_0$.

32. A method according to claim 30, wherein the key is used to determine at least a part of the initial step length $\Delta T_0$.

33. A method according to claim 30, wherein the key is used to determine the at least a part of at least one of the parameters.

34. A method according to claim 30, wherein the key is a public key.

35. A method according to claim 30, wherein the key is a private key.

36. A method according to claim 2, comprising extracting a plurality of numbers resulting from the computations.

37. A method according to claim 2, wherein the step of extracting comprises extracting at least one number derived from k bits of the resulting number.

38. A method according to claim 2, wherein the step of extracting comprises extracting the k least significant bits of the resulting number.

39. A method according to claim 37, wherein k is a value selected from the group consisting of: 8, 16, 32, 64, and 128.

40. A method according to claim 37, wherein a plurality of numbers are extracted.

41. A method according to claim 2, wherein the extracted set of data is manipulated by means of at least one of:
   an arithmetic operation, and
   a logical operation,
so as to obtain a combined set of data.

42. A method according to claim 41, wherein at least one of the:
   extracted set of data, and
   the combined set of data
is combined with original data, so as to encrypt the original data.

43. A method according to claim 41, wherein at least one of:
   extracted set of data, and
   the combined set of data
is combined with encrypted data, so as to decrypt the encrypted data and obtain the original data.

44. A method according to claim 41, wherein the combining of data comprises an XOR operation.

45. A method according to claim 2, wherein said computations include data representing a block of plaintext in a block-cipher encryption and decryption system.

46. A method according to claim 2, wherein the extracted set of data is used to define at least one operation on a block of plaintext in a block-cipher encryption and decryption system.

47. A method according to claim 42, wherein the combining of data comprises addition of the original data and the combined set of data for encryption, and subtraction of the combined set of data from the encrypted data for decryption.

48. A method according to claim 42, wherein the combining of data comprises subtraction of the combined set of data from the original data for encryption, and addition of the combined set of data and the encrypted data for decryption.

49. A method according to claim 2, wherein the extracted set of data is used as at least one of: an encryption key and a decryption key.

50. A method according to claim 2, wherein the extracted set of data is used to generate at least one of: an encryption key and a decryption key.

51. A method according to claim 2, wherein the extracted set of data is used in generation of data representing a digital signature.

52. A method according to claim 2, wherein the extracted set of data is used in watermarking of digital data.

53. A method according to claim 2, wherein the computations are performed on an electronic device which comprises an electronic processing unit having a register width, the method comprising the steps of:
   expressing at least one integer number of a bit width larger than said register width as at least two sub-numbers each having a bit width which is at most equal to said register width,
   performing at least one of said computations as a sub-computation on each of the sub-numbers so as to arrive at at least two partial results, expressed as integer numbers of a bit width smaller which is at most equal to the register width of the processing unit,
   concatenating the partial results to yield a representation of a result of said at least one computation.

54. A computer program for performing the method of claim 1, wherein the integer number is a fixed-point number, the computer program being adapted to:
   perform said computations in such a way that the computations include the at least one variable expressed as a fixed-point number,
   obtain, from said computations, the resulting number, the resulting number representing at least one of:
      a. at least a part of a solution to the mathematical system, and
      b. a number usable in further computations involved in the numerical solution of the mathematical system,
   the computer program being further adapted to:
      extract a set of data which represents at least one of:
         i. a subset of digits of the resulting number, and
         ii. a subset of digits of a number derived from the resulting number.

55. A computer readable data carrier loaded with a computer program for performing the method of claim 1, wherein the integer number is a fixed-point number, the computer program being adapted to:
   perform said computations in such a way that the computations include the at least one variable expressed as a fixed-point number,
   obtain, from said computations, the resulting number, the resulting number representing at least one of:
      a. at least a part of a solution to the mathematical system, and
      b. a number usable in further computations involved in the numerical solution of the mathematical system,
   the computer program being further adapted to:
      extract a set of data which represents at least one of:
         i. a subset of digits of the resulting number, and
         ii. a subset of digits of a number derived from the resulting number.

56. A computer which is operatively connected to a computer readable data carrier loaded with a computer program for performing the method of claim 1, wherein the integer number is a fixed-point number, the computer program being adapted to:
    perform said computations in such a way that the computations include the at least one variable expressed as a fixed-point number,
    obtain, from said computations, the resulting number, the resulting number representing at least one of:
        a. at least a part of a solution to the mathematical system, and
        b. a number usable in further computations involved in the numerical solution of the mathematical system,
the computer program being further adapted to:
    extract a set of data which represents at least one of:
        i. a subset of digits of the resulting number, and
        ii. a subset of digits of a number derived from the resulting number, wherein the computer comprises processor means for running said program.

57. An extracted set of data which have been derived from the method of claim 1, wherein the integer number is a fixed-point number,
    said computations have been performed in such a way that the computations have included the at least one variable expressed as a fixed-point number,
    the resulting number has been obtained from said computations, the resulting number representing at least one of:
        a. at least a part of a solution to the mathematical system, and
        b. a number usable in further computations involved in the numerical solution of the mathematical system,
whereby the extracted set of data represents at least one of:
    i. a subset of digits of the resulting number, and
    ii. a subset of digits of a number derived from the resulting number.

58. An encrypted set of data which has been derived as a combination of plaintext and at least one set of data extracted from computations in accordance with the method of claim 1, wherein the integer number is a fixed-point number,
    said computations have been performed in such a way that the computations have included the at least one variable expressed as a fixed-point number,
    the resulting number has been obtained from said computations, the resulting number representing at least one of:
        a. at least a part of a solution to the mathematical system, and
        b. a number usable in further computations involved in the numerical solution of the mathematical system,
whereby the extracted set of data represents at least one of:
    i. a subset of digits of the resulting number, and
    ii. a subset of digits of a number derived from the resulting number.

59. A method of generating a pseudo-random number, the method comprising:
    performing the method of claim 1;
    II) defining a seed value representing at least an initial condition for the mathematical system, wherein the integer number is a fixed-point number,
    IV) performing said computations in an electronic device, the computations including the at least one variable expressed as a fixed-point number and obtaining, from said computations, a resulting number, the resulting number representing at least one of:
    a. at least a part of a solution to the mathematical system, and
    b. a number usable in further computations involved in the numerical solution of the mathematical system,
    V) extracting, as the pseudo-random number, a number derived from at least one number which has occurred during the computations.

60. A method according to claim 59, wherein the pseudo-random number is extracted as a number derived from k digits of said at least one number which has occurred during the computations.

61. A method according to claim 60, wherein the pseudo-random number is extracted as a number derived from the k least significant digits of said at least one number.

62. A method according to claim 59, the method comprising the steps of repeating steps IV) and V) until a given amount of pseudo-random numbers has been generated.

63. A method according to claim 59, wherein a given amount of pseudo-random numbers is generated and stored in a memory of the electronic device as a spare seed value.

64. A method according to claim 59, wherein a plurality of resulting numbers are obtained which represent at least parts of solutions to the mathematical system, the method further comprising detecting periodic behavior in the solution of the mathematical system, the mathematical system comprising at least one non-linear function governing at least one state variable with respect to at least one independent variable, the detecting of periodic behavior comprising:
    variable with respect to at least one independent variable, the detecting of periodic behavior comprising:
        storing selected solutions in an array, A, in a memory of the electronic device, the array being adapted to store a finite number, n+1, of solutions,
        determining whether at least one of:
        a current solution, and
        a particular one of said solutions stored in the array is substantially identical to another solution stored in the array,
the method further comprising:
    if the step of determining reveals that at least one of
        the current solution, and
        the particular solution
is identical to another solution:
    interrupting the pseudo-random-number generation, i.e. interrupting repetition of steps IV) and V),
    using the spare seed value as the seed value in the step II),
    resuming the pseudo-random-number generation, i.e. resuming repetition of steps IV) and V).

65. A method according to claim 64, further comprising, prior to the step of resuming the pseudo-random number generation, generating and storing, in a memory of the electronic device, a given amount of pseudo-random numbers as a new spare seed value.

66. A method according to claim 59, wherein each level in the array, A, is reset prior to step IV), when steps IV) and V) are initiated with a new seed value at step II).

67. A method of encrypting a set of original data into a set of encrypted data, the method comprising the steps of:
    A) generating a pseudo-random number by performing the method of claim 1;
    V) extracting, as the pseudo-random number, a number derived from at least one number which has occurred during the computations,
    B) manipulating the original data and the pseudo-random number by means of at least one of:
    i. an arithmetic operation, and
    ii. a logical operation,
so as to obtain a combined set of data, the combined set of data being the encrypted data.

68. A method according to claim 67, wherein, prior to step A), a sub-set of the original data is separated from the set of data, and wherein step B) is performed on the sub-set of data.

69. A method according to claim 67, wherein the pseudo-random number is extracted as a number derived from k digits of said at least one number which has occurred during the computations.

70. A method according to claim 67, wherein the pseudo-random number is extracted as a number derived from the k least significant digits of said at least one number which has occurred during the computations.

71. A method according to claim 67, the method comprising the steps of repeating steps IV) and V) until a given amount of pseudo-random numbers has been generated.

72. A method according to claim 67, wherein a given amount of pseudo-random numbers is generated and stored in a memory of the electronic device as a spare encryption key.

73. A method according to claim 72, wherein a plurality of resulting numbers are obtained which represent at least parts of solutions to the mathematical system, the method further comprising detecting periodic behavior in the solution of the mathematical system, the mathematical system comprising at least one non-linear function governing at least one state variable with respect to at least one independent variable, the detecting of periodic behavior comprising:
   storing selected solutions in an array, A, in a memory of the electronic device, the array being adapted to store a finite number, n+1, of solutions,
   determining whether at least one of:
      a current solution, and
      a particular one of said solutions stored in the array
   is substantially identical to another solution stored in the array,
the method further comprising:
   if the step of determining reveals that at least one of:
      the current solution, and
      the particular solution
   is identical to another solution:
      interrupting the pseudo-random number generation, i.e. interrupting repetition of steps IV) and V),
      using the spare encryption key as the encryption key in step II),
      resuming the pseudo-random number generation, i.e. resuming repetition of steps IV) and V).

74. A method according to claim 73, further comprising, prior to the step of resuming the pseudo-random number generation, generating and storing, in a memory of the electronic device, a given amount of pseudo-random numbers as a new spare encryption key.

75. A method according to claim 67, wherein each level in the array, A, is reset prior to step IV), when steps IV) and V) are initiated with a new seed value at step II).

76. A method of decrypting a set of encrypted data which has been encrypted by a method of encrypting a set of original data into said set of encrypted data, the method of encrypting comprising the steps of:
   A) generating a pseudo-random number by performing the method of claim 1;
   V) extracting, as the pseudo-random number, a number derived from at least one number which has occurred during the computations,
   B) manipulating the original data and the pseudo-random number by means of at least one of:
      i. an arithmetic operation, and
      ii. a logical operation,
so as to obtain a combined set of data, the combined set of data being the encrypted data, the method of decrypting comprising the steps of:
   a) performing step A), so as to extract the same pseudo-random number as extracted in step V),
   b) manipulating the encrypted data and the pseudo-random number by means of at least one of:
      an arithmetic operation, and
      a logical operation,
so as to obtain the original, decrypted, version of the data.

77. A method according to claim 76, wherein, prior to step a), a sub-set of the encrypted data is separated from the set of encrypted data, the method of decrypting comprising performing steps a) and b) on said sub-set of data.

78. A method according to claim 77, comprising repeating the steps A)–B) until a plurality of sub-sets which in common constitute the entire set of encrypted data have been decrypted.

79. A computer program for encrypting and decrypting a set of data, the computer program being adapted to run in an encryption mode and in a decryption mode; the computer program being further adapted to:
   i) generate a pseudo-random number in a reproducible way by performing the method of claim 1, wherein the integer number is a fixed-point number,
   performing computations including the at least one variable expressed as a fixed-point number,
   obtaining, from the computations, the resulting number, the resulting number representing at least one of:
      a. a part of a solution to the mathematical system, and
      b. a number usable in further computations involved in the numerical solution of the mathematical system,
   extracting, as the pseudo-random number, a number derived from at least one number which has occurred during the computations,
   ii) manipulate the data and the pseudo-random number by means of at least one of:
      an arithmetic operation, and
      a logical operation,
so as to obtain a combined set of data, wherein:
   the combined set of data represents an encrypted version of the data in case the computer program is run in encryption mode,
   the combined set of data represents a decrypted version of the data in case the computer program is run in decryption mode.

80. A computer readable data carrier loaded with a computer program for encrypting and decrypting a set of data, the computer program being adapted to run in an encryption mode and in a decryption mode, the computer program being further adapted to:
   i) generate a pseudo-random number in a reproducible way by performing the method of claim 1, wherein the integer number is a fixed-point number,
   performing computations including the at least one variable expressed as a fixed-point number,
   obtaining, from the computations, the resulting number, the resulting number representing at least one of:
      a. a part of a solution to the mathematical system, and
      b. a number usable in further computations involved in the numerical solution of the mathematical system,
   extracting, as the pseudo-random number, a number derived from at least one number which has occurred during the computations,
   ii) manipulate the data and the pseudo-random number by means of at least one of:
      an arithmetic operation, and
      a logical operation, so as to obtain a combined set of data, wherein:

the combined set of data represents an encrypted version of the data in case the computer program is run in encryption mode, the combined set of data represents a decrypted version of the data in case the computer program is run in decryption mode.

81. A computer being operatively connected to a computer readable data carrier loaded with a computer program for encrypting and decrypting a set of data, the computer program being adapted to run in an encryption mode and in a decryption mode, the computer program being further adapted to:

i) generate a pseudo-random number in a reproducible way by performing the method of claim 1, wherein the integer number is a fixed-point number, performing computations including the at least one variable expressed as a fixed-point number, obtaining, from the computations, the resulting number, the resulting number representing at least one of:

a. a part of a solution to the mathematical system, and b. a number usable in further computations involved in the numerical solution of the mathematical system, extracting, as the pseudo-random number, a number derived from at least one number which has occurred during the computations, ii) manipulate the data and the pseudo-random number by means of at least one of:

an arithmetic operation, and a logical operation, so as to obtain a combined set of data, wherein:

the combined set of data represents an encrypted version of the data in case the computer program is run in encryption mode, the combined set of data represents a decrypted version of the data in case the computer program is run in decryption mode, the computer comprising processor means for running said program.

82. A method according to claim 79, further comprising: performing steps I)–V) in a plurality of instances in parallel.

83. A method according to claim 82, comprising transmitting data between the plurality of instances at least while performing step IV) for each of the instances.

84. A method according to claim 82, further comprising transmitting data between the plurality of instances while performing step V) for each of the instances.

85. A method according to claim 82, comprising combining, by use of at least one of:

an arithmetic operation, and a logical operation, a plurality of pseudo-random numbers extracted at step V) in each of the instances into a common pseudo-random number.

86. The method of claim 1, wherein the integer number is a fixed-point number, performing said computations in such a way that the computations include the at least one variable expressed as a fixed-point number, obtaining, from said computations, a resulting number, the resulting number representing at least one of:

a. at least a part of a solution to the mathematical system, and b. a number usable in further computations involved in the numerical solution of the mathematical system, the step of performing computations comprising:

repeatedly computing a solution $X_{n+1}$ based on at least one previous solutions $X_m$, $m \leq n+1$, whereby the step of performing computations is initiated based on at least one initial condition, $X_0$, of the state variable, X, the method further comprising:

providing a cryptographic key as an input to said computations, whereby the cryptographic key is used in generation of the initial condition $X_0$.

87. A method of determining an identification value for identifying a set of data, the method comprising performing as the method of claim 1, wherein the integer number is a fixed-point number, performing said computations in such a way that the computations include the at least one variable expressed as a fixed-point number, obtaining, from said computations, the resulting number, the resulting number representing at least one of:

a. at least a part of a solution to the mathematical system, and b. a number usable in further computations involved in the numerical solution of the mathematical system, whereby a representation of at least part of the set of data is used in said computations, the method further comprising:

extracting, as said identification value, at least a part of said resulting number.

88. A method according to claim 87, wherein a cryptographic key is used as a seed value for the computations.

89. A method according to claim 87, wherein the mathematical system comprises at least one of:

a differential equation, a discrete mapping.

90. A method according to claim 89, wherein the differential equation comprises at least one of:

a partial differential equation, an ordinary differential equation.

91. A method according to claim 89, wherein the discrete mapping comprises at least one of:

an area-preserving map, a non area-preserving map.

92. A method according to claim 89, wherein the mathematical system comprises at least one non-linear function governing at least one state variable X.

93. A method according to claim 92, wherein the non-linear mapping function comprises a logistic map of the form $x_{n+1} = \lambda x_n (1+x_n)$, wherein $\lambda$ is a parameter, $x_{n+1}$ is the value of state variable x at the (n+1)'th stage in the computations, and $x_n$ is the value of state variable x at the n'th stage in the computations.

94. A method according to claim 93, wherein the logistic map is modified into the form $x_{n+1} = \lambda x_n(1-x_n) + \epsilon(x_n - m_n)$, wherein $\lambda$ and $\epsilon$ are parameters, $x_{n+1}$, is the value of state variable x at the (n+1)'th stage in the computations, $x_n$ is the value of state variable x at the n'th stage in the computations, and $m_n$ contains a representation of an n'th portion of the set of data.

95. A method according to claim 93, wherein a cryptographic key is used for at least partially determining at least one of the following: $\lambda$, $\epsilon$ and an initial value $x_0$ of state variable x.

96. A method according to claim 87, wherein the mathematical system comprises a set of non-linear mapping functions.

97. A method according to claim 96, wherein the set of mapping functions comprises at least one of:

an Anosov map of the form:

$$\begin{bmatrix} x_{n+1} \\ y_{n+1} \end{bmatrix} = \begin{bmatrix} 1 & 1 \\ 1 & 2 \end{bmatrix} \begin{bmatrix} x_n \\ y_n \end{bmatrix} \mod 1,$$

a Hénon map of the form:

$$\begin{bmatrix} x_{n+1} \\ y_{n+1} \end{bmatrix} = \begin{bmatrix} 1 + y_n - ax_n^2 \\ bx_n \end{bmatrix}.$$

98. A method according to claim 87, wherein the mathematical system comprises at least one non-linear differential equation.

99. A method according to claim 98, wherein the mathematical system comprises a set of non-linear differential equations.

100. A method according to claim 87, wherein the mathematical system has at least one positive Lyapunov exponent.

101. A method according to claim 87, comprising computing at least one Lyapunov exponent at least once during the mathematical computations.

102. A method according to claim 98, wherein the at least one non-linear differential equation governs at least one state variable, X, which is a function of at least one independent variable, t.

103. A method according to claim 99, wherein the set of non-linear differential equations comprises a Lorenz system.

104. The method of claim 1, further comprising:
restricting the range of at least a selected variable of said function, so as to exclude values which the selected variable, by virtue of said function, would assume if not restricted by said range,
performing said computations so as to obtain the resulting number, the resulting number representing at least one of:
a. a part of a solution to the mathematical system, and
b. a number usable in further computations involved in the numerical solution of the mathematical system,
when the computations result in a value for the selected variable which is beyond the range, assigning a value within the range to the selected variable.

105. A method according to claim 104, wherein the method is a part of a pseudo-random number generating method.

106. A method according to claim 105, wherein the pseudo-random number generating method generates pseudo-random numbers for use in at least one of encryption and decryption.

107. A method according to claim 104, wherein the mathematical system has at least one positive Lyapunov exponent.

108. The method of claim 1, wherein the integer number is a fixed-point number, performing said computations in such a way that the computations include the at least one variable expressed as a fixed-point number,
obtaining, from said computations, the resulting number, the resulting number representing at least one of:
a. at least a part of a solution to the mathematical system, and
b. a number usable in further computations involved in the numerical solution of the mathematical system.

109. The method according to claim 59, wherein the pseudo random number represents at least one of:
i. a subset of digits of the resulting number, and
ii. a subset of digits of a number derived from the resulting number.

110. The method according to claim 109, wherein the pseudo-random number is extracted as a number derived from the k least significant digits of said at least one number.

111. The method according to claim 109, wherein said computations involve at least a first and a second fixed-point number, each fixed-point number having a decimal separator, wherein the decimal separator of the first fixed-point number is positioned at a position different from the position of the decimal separator of the second fixed-point number.

112. The method according to claim 109, wherein the mathematical system comprises a discrete mapping, comprising at least one of:

a logistic map of the form:

$x_{n+1} = \mu x_n (1 - x_n),$ an Anosov map of the form:

$$\begin{bmatrix} x_{n+1} \\ y_{n+1} \end{bmatrix} = \begin{bmatrix} 1 & 1 \\ 1 & 2 \end{bmatrix} \begin{bmatrix} x_n \\ y_n \end{bmatrix} \mod 1,$$

a Hénon map of the form:

$$\begin{bmatrix} x_{n+1} \\ y_{n+1} \end{bmatrix} = \begin{bmatrix} 1 + y_n - ax_n^2 \\ bx_n \end{bmatrix}.$$

113. The method according to claim 109, wherein the mathematical system comprises at least one of:
a differential equation,
a discrete mapping,
and wherein the mathematical system has at least one positive Lyapunov exponent.

114. The method according to claim 109, wherein the mathematical system comprises a set of non-linear differential equations, which set is a Lorenz system consisting of the following differential equations:

$$\frac{dx}{dt} = \sigma(y - x),$$

$$\frac{dy}{dt} = rx - y - xz,$$

$$\frac{dz}{dt} = xy - bz,$$

wherein X=(x, y, z) are state variables, t is the independent variable, and σ, r and b are parameters.

115. The method according to claim 109, wherein the mathematical system comprises at least one non-linear differential equation, wherein:
the step of performing computations comprises numerically integrating the at least one non-linear differential equation by repeatedly computing a solution $X_{n+1}$ based on at least one previous solution $X_m$, m≤n+1, and a step length, ΔTn, of the independent variable, t, and wherein in each integration step, at least one of the elements ($\Delta t_{x,n}$, $\Delta t_{y,n}$, $\Delta t_{z,n}$) of the step length $\Delta T$ is a function of at least one number related to said computations.

116. The method according to claim 109, wherein a key selected from an encryption key and a decryption key is used to determine at least one value of at least one variable in the mathematical system.

117. The method according to claim 116, wherein the mathematical system includes at least one parameter, an initial condition $X_0$, and an initial step length $\Delta T_0$, and wherein the key is used to determine at least one of:
at least a part of the initial condition $X_0$,
at least a part of the initial step length $\Delta T_0$, and at least a part of said at least one parameter.

118. The method according to claim 110, wherein said step of extracting comprises extracting a plurality of numbers.

119. The method according to claim 109, wherein the extracted number is manipulated by means of at least one of:
an arithmetic operation, and
a logical operation,
so as to obtain a combined set of data.

120. The method according to claim 119, wherein at least one of:
the extracted set of data, and
the combined set of data
is used for at least one of:
encryption of original data to obtain encrypted data, and
decryption the encrypted data to obtain the original data.

121. The method according to claim 109, wherein the extracted number is used to generate at least one of: an encryption key and a decryption key.

122. The method according to claim 109, the method comprising performing steps I)–V) in a plurality of instances in parallel and transmitting data between the plurality of instances at least while performing at least one of steps IV) and V) for each of the instances.

123. The method according to claim 122, comprising combining, by use of at least one of:
an arithmetic operation, and
a logical operation,
a plurality of pseudo-random numbers extracted at step V) in each of the instances into a common pseudo-random number.

* * * * *

UNITED STATES PATENT AND TRADEMARK OFFICE
CERTIFICATE OF CORRECTION

| | | |
|---|---|---|
| PATENT NO. | : 7,170,997 B2 | Page 1 of 1 |
| APPLICATION NO. | : 10/017230 | |
| DATED | : January 30, 2007 | |
| INVENTOR(S) | : Mette Vesterager Petersen and Hans Martin Boesgaard Sorensen | |

It is certified that error appears in the above-identified patent and that said Letters Patent is hereby corrected as shown below:

On the title page insert the following after

"(22)        Filed:   Dec. 7, 2001"

--Related U.S. Application Data

(60)    Provisional application No. 60/251,517, filed on Dec. 7, 2000.--

Signed and Sealed this

Third Day of July, 2007

JON W. DUDAS
*Director of the United States Patent and Trademark Office*